(12) United States Patent
Puchades et al.

(10) Patent No.: US 10,581,176 B2
(45) Date of Patent: Mar. 3, 2020

(54) THIN-FILM SENSOR ANTENNA

(71) Applicants: Ivan Puchades, Honeoye Falls, NY (US); Brian J. Landi, Rochester, NY (US); Jamie E. Rossi, Penfield, NY (US); Cory D. Cress, Alexandria, VA (US)

(72) Inventors: Ivan Puchades, Honeoye Falls, NY (US); Brian J. Landi, Rochester, NY (US); Jamie E. Rossi, Penfield, NY (US); Cory D. Cress, Alexandria, VA (US)

(73) Assignee: Rochester Institute of Technology, Rochester, NY (US)

( * ) Notice: Subject to any disclaimer, the term of this patent is extended or adjusted under 35 U.S.C. 154(b) by 75 days.

(21) Appl. No.: 15/591,712

(22) Filed: May 10, 2017

(65) Prior Publication Data

US 2017/0331172 A1 Nov. 16, 2017

Related U.S. Application Data

(60) Provisional application No. 62/334,120, filed on May 10, 2016.

(51) Int. Cl.
*H01Q 21/00* (2006.01)
*G01D 5/16* (2006.01)
(Continued)

(52) U.S. Cl.
CPC ........... *H01Q 21/0087* (2013.01); *G01D 5/16* (2013.01); *H01Q 1/368* (2013.01); *H04B 17/12* (2015.01); *H04B 17/21* (2015.01)

(58) Field of Classification Search
CPC .. G01D 5/00; G01D 5/12; G01D 5/14; G01D 5/16; G01D 21/00; H01Q 1/00;
(Continued)

(56) References Cited

U.S. PATENT DOCUMENTS 3,778,834 A * 12/1973 Poppe ..................... G01S 3/143
342/432
6,329,649 B1 12/2001 Jack et al.
(Continued)

FOREIGN PATENT DOCUMENTS

WO 2009089992 A1 7/2009

OTHER PUBLICATIONS

Valentini et al., "Highly Sensitive and Selective Sensors Based on Carbon Nanotubes Thin Films for Molecular Detection", Diamond and Related Materials, 2004, pp. 1301-1305, vol. 13, No. 4-8.
(Continued)

*Primary Examiner* — Hoai-An D. Nguyen
(74) *Attorney, Agent, or Firm* — Bond, Schoeneck & King, PLLC; Joseph Noto

(57) ABSTRACT

A sensor antenna including a thin film material constructed in the shape of an antenna having a response, the material including a sheet resistance capable of being modified by an external stimulus where the antenna response varies over a range of sheet resistance values; method of making a sensor antenna; system including a sensor antenna; and method for operating a thin film sensor antenna including providing a thin film sensor antenna; exposing the sensor antenna to an external stimulus, simultaneously sensing the external stimulus while varying the sensor antenna response, measuring the change in the sensor antenna response, and correlating the measured response to a known change in the stimulus are disclosed.

18 Claims, 21 Drawing Sheets

(51) Int. Cl.
*H01Q 1/36* (2006.01)
*H04B 17/12* (2015.01)
*H04B 17/21* (2015.01)

(58) Field of Classification Search
CPC ........ H01Q 1/2208; H01Q 1/36; H01Q 1/364; H01Q 1/368; H01Q 1/38; H01Q 21/00; H01Q 21/0087; H01Q 21/30; H04B 17/102; H04B 17/12; H04B 17/21; G01J 5/0837; G01K 1/024; G01K 7/16
USPC ....... 324/600, 602, 603, 605, 629, 637, 601; 343/700 R, 793, 824
See application file for complete search history.

(56) References Cited

U.S. PATENT DOCUMENTS

| | | | |
|---|---|---|---|
| 6,329,655 B1 | 12/2001 | Jack et al. | |
| RE42,773 E * | 10/2011 | Tuttle | G01S 13/758 235/380 |
| 8,486,545 B2 | 7/2013 | Lanning et al. | |
| 8,497,505 B2 | 7/2013 | Kim et al. | |
| 8,674,830 B2 | 3/2014 | Lanham et al. | |
| 9,184,490 B2 | 11/2015 | Crouther et al. | |
| 2004/0200967 A1 | 10/2004 | Russell | |
| 2009/0231205 A1 | 9/2009 | Burke et al. | |
| 2010/0288635 A1 * | 11/2010 | Komiya | G01B 7/16 204/406 |
| 2013/0230429 A1 | 9/2013 | Naishadham et al. | |
| 2013/0320212 A1 | 12/2013 | Valentino et al. | |
| 2014/0306725 A1 | 10/2014 | Carr | |
| 2015/0099479 A1 | 4/2015 | Winters | |
| 2015/0237419 A1 | 8/2015 | Lee et al. | |
| 2015/0338524 A1 | 11/2015 | Ben Moshe et al. | |
| 2016/0058375 A1 * | 3/2016 | Rothkopf | G06F 1/1643 600/301 |
| 2016/0190678 A1 * | 6/2016 | Hong | H01Q 1/38 343/700 MS |
| 2017/0027514 A1 * | 2/2017 | Biederman | A61B 5/6832 |
| 2017/0040711 A1 * | 2/2017 | Rakib | H01Q 1/246 |

OTHER PUBLICATIONS

Wong et al., "A Novel Microelectronic Gas Sensor Utilizing Carbon Nanotubes for Hydrogen Gas Detection", Sensors and Actuators B, 2003, pp. 327-332, vol. 93, No. 1-3.
Biju et al., "Carbon Nanotube/PMMA Composite Thin Films for Gas-sensing Applications", Smart Materials and Structures, 2003, p. 935, vol. 12, No. 6.
Peng et al., "Ab Inito Study of Doped Carbon Nanotube Sensors", Nano Letter, 2003, pp. 513-517, vol. 3, No. 4.
Li et al., "Carbon Nanotube Sensors for Gas and Organic Vapour Detection", Nano Letters, 2003, pp. 929-933, vol. 3, No. 4.
Rossi et al., "Intrinsic Diameter Dependent Degradation of Single-wall Carbon Nanotubes from Ion Irradiation", Carbon, 2014, pp. 488-496, vol. 81.
Kang et al., "A Carbon Nanotube Strain Sensor for Structural Health Monitoring", Smart Materials and Structures, 2006, p. 737, vol. 15, No. 3.
Ong et al., "A Wireless, Passive Carbon Nanotube-based Gas Sensor", Sensors Journal, 2002, pp. 82-88, IEEE 2, No. 2.
Khatko et al., "New Technology of Metal Oxide Thin Film Preparation for Chemical Sensor Application" Sensors and Actuators B: Chemical 109.1, 2005, pp. 128-134.
"Frequency-tunable Soft Composite Antennas for Wireless Sensing", Sensors Actuators A Phys, 2012, pp. 137-145, vol. 170.
"Radiation performance of Polarization Selective Carbon Nanotube Sheet Patch Antennas" IEEE Trans. Antennas Propag., 2014, pp. 48-55, vol. 62, No. 1.
"Multi-walled Carbon Nanotube-based RF Antennas" Nanotechnology, 2010, p. 45301, vol. 21.
"Radiation Efficienty of Monopole Antenna made of a Transparent Conductive Film" 2007 IEEE Antennas and Propagation, pp. 221-224.

* cited by examiner

THIN-FILM SENSOR ANTENNA

CROSS REFERENCE

This application claims the benefit of the filing date of U.S. Provisional Patent Application Ser. No. 62/334,120, filed May 10, 2016, which is hereby incorporated by reference in its entirety.

This invention was made with government support under grant number HDTRA-1-10-1-0122 awarded by the Defense Threat Reduction Agency and under grant number 2013-13071200005 awarded by the Central Intelligence Agency. The government has certain rights in this invention.

FIELD

The present invention relates to a sensor antenna, and in particular, to a sensor antenna capable of modulating its electrical properties in response to external stimulus.

BACKGROUND

Existing thin-film-based sensors can be used to sense a multiplicity of environmental factors. Many of these sensors are based on changes to the sheet resistance of the thin film. The interrogation of these sensors is usually done using a hard-wired measuring unit, such as an electrical signal (voltage or current). This signal is usually transmitted via a physical electrical connection to a processing unit, which in turn analyzes and/or transmits the data wirelessly to a receiving unit. These conventional systems can be small in size and portable but require wired connections for their interrogation unless complex wireless capabilities are integrated within the system.

A device that uses a monopole or dipole antenna to monitor corrosion has been presented in US2014/306725 A1. This device does not use a thin-film configuration and its sensitivity can only by adjusted by the tapered shape of the antenna. It is also exclusively related to corrosion and does not include sensing of other stimuli.

Wireless transmission of CNT-based sensors is usually carried out by a microprocessor, which measures and transmits the signal, adding system complexity and power consumption as presented in US2015/0338524 A1.

Autonomous wireless solutions generally introduce a CNT-based element to the transmitting antenna in order to indirectly affect the transmitting signal of the antenna. One solution loads a metal-based antenna with a CNT-based patch to change the resonant frequency of the antenna, US2013/0230429 A1. Others, such as Ong et al. 2002, have proposed a passive capacitive-sensitive sensor based on changes to the permittivity constant of a CNT-based material which can be wirelessly interrogated.

The art currently lacks an "all-in-one" wireless sensor where the change in the sheet resistance of the thin-film sensor material causes a simultaneous attenuation of the wireless antenna signal, for example, a thin-film of nanomaterials which can show dramatic changes in sheet resistance, which directly impacts the wireless signal.

SUMMARY

In accordance with one aspect of the present invention, there is provided a sensor antenna including a thin film material constructed in the shape of an antenna having a response, the material including a sheet resistance capable of being modified by an external stimulus where the antenna response varies over a range of sheet resistance values for a given matching network.

In accordance with another aspect of the present disclosure, there is provided a method of making a sensor antenna, including providing a thin-film of a material including a sheet resistance capable of being modified by an external stimulus where the antenna response varies over a range of sheet resistance values for a given matching network; depositing the thin-film on a substrate; patterning the thin-film into the shape of an antenna having a response; and providing the antenna with electrical contacts sufficient to function as an antenna.

In accordance with another aspect of the present disclosure, there is provided a system including a sensor antenna including a thin film material constructed in the shape of an antenna having a response, the material including a sheet resistance capable of being modified by an external stimulus where the antenna response varies over a range of sheet resistance values for a given matching network and a reference antenna shielded from the external stimulus such that the difference in measured response between the sensor antenna and the reference antenna provides a measure of the change of the stimulus experienced by the sensor antenna.

In accordance with another aspect of the present disclosure, there is provided a method for operating a thin film sensor antenna including providing a thin film sensor antenna including a sheet resistance capable of being modified by an external stimulus where the antenna response varies over a range of sheet resistance values for a given matching network; exposing the sensor antenna to an external stimulus; simultaneously sensing the external stimulus while varying the sensor antenna response; measuring the change in the sensor antenna response; and correlating the measured response to a known change in the stimulus.

These and other aspects of the present disclosure will become apparent upon a review of the following detailed description and the claims appended thereto.

DETAILED DESCRIPTION

Figure 1:
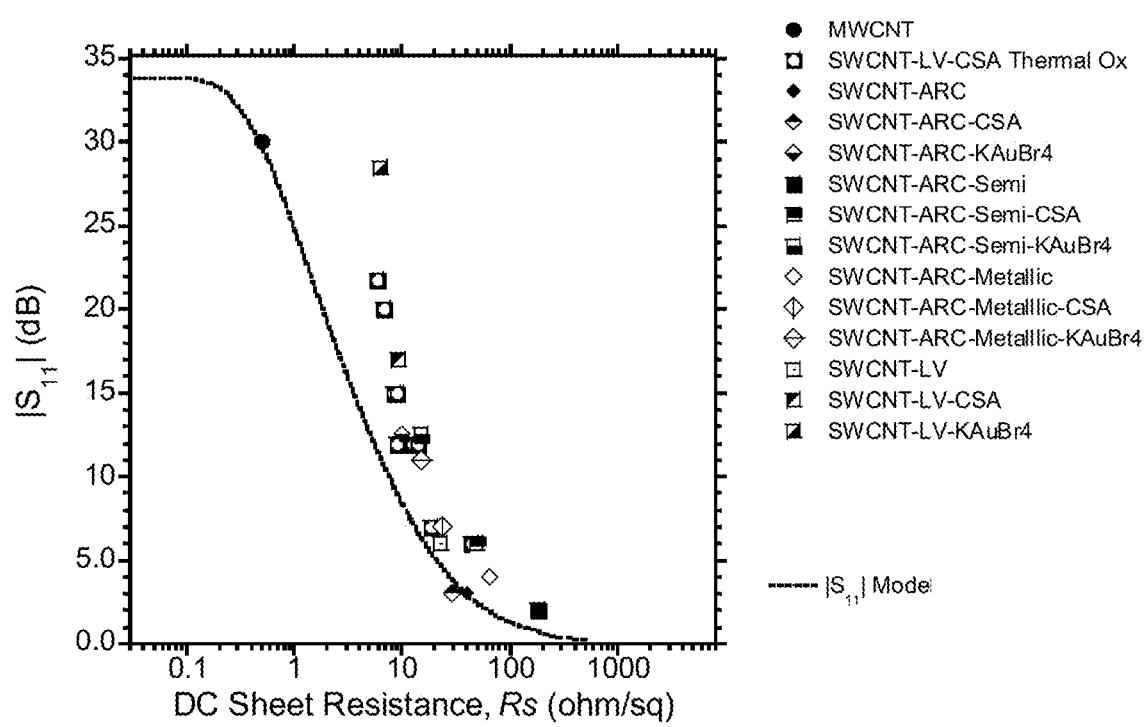
FIG. 1 is a graph of experimentally measured return loss vs. sheet resistance for a variety of thin-film antennas in accordance with an embodiment of the present invention compared to theoretically modeled values.

The present invention relates to a sensor antenna, method of making a sensor antenna, method or utilizing a sensor antenna, and a system utilizing at least one sensor antenna. In an embodiment, a sensor antenna includes a thin-film material constructed in a geometry suitable to act as an antenna, and the thin-film material has suitable electrical properties to simultaneously act as a sensor by modulating its electrical properties in response to external stimulus.

An embodiment of the sensor antenna includes a thin film material constructed in the shape of an antenna having a response, the material including a sheet resistance capable of being modified by an external stimulus where the antenna response varies over a range of sheet resistance values. An embodiment of the method for varying the response of a thin film sensor antenna over a range of sheet resistance values includes providing a thin film sensor antenna having a sheet resistance capable of being modified by an external stimulus where the antenna response varies over a range of sheet resistance values for a given matching network, exposing the sensor antenna to an external stimulus, simultaneously sensing the external stimulus by the varying of the sensor antenna response, measuring the change in the sensor antenna response, and correlating the measured response to a known change in the stimulus.

A sensor antenna may be fabricated from a number of different materials, provided that the specified material can be formed into a thin-film and that the electrical properties of the material, in thin-film form, can be modulated (i.e., exhibit a known increase or decrease in sheet resistance) when exposed to an external stimulus. Sensor antennas may be fabricated with conventional materials (copper, aluminum, metal oxides, or the like), and are also amenable to fabrication by a variety of nanomaterials. It is a basic requirement of all thin-film sensor antennas to be electrically conductive, with a known initial sheet resistance ($R_s$), and exhibit a calibrated change in $R_s$ when exposed to an external stimulus; the extent of $R_s$ enhancement or degradation will be dependent on the specific stimulus and total exposure to the stimulus. Thus, nanomaterials, such as carbon nanotubes (CNTs), are of particular interest for the fabrication of sensor antennas, as their chirality (i.e., electronic-type, diameter, length, bundle size, alignment, quality, etc.), and therefore, electrical properties, can be selected for a desired sensor application. For example, CNTs, and composites thereof, can be synthesized via chemical vapor deposition, laser vaporization, arc discharge, etc., resulting in CNTs that are either single- or multi-walled and have unique chiral distributions. Similarly, other chiral allotropes of carbon, such as graphene, can be synthesized and specifically selected for the fabrication of thin-film sensor antennas. In addition to carbon-based materials, other two dimensional (2D) crystalline materials that are only a single atom thick, such as phosphorene, borophene, germanene, silicone, $Si_2BN$, etc., exhibit the physical and electrical attributes required by a thin-film sensor antenna. A class of 2D materials, known as transition metal dichalcogenides (TMDC), has recently emerged, making them unique candidate materials for thin-film sensor antennas due to their direct bandgap. TMDC materials contain one layer of a particular transition metal (i.e., Mo, W, etc.) sandwiched between two layers of a chalcogen atom (i.e., S, Se, Te, etc.), and may include $MoS_2$, $WS_2$, $MoSe_2$, $MoTe_2$, etc. The class of 2D and TMDC described above are sensitive to the local environment in monolayer form, and are also sensitive as bilayers or few layers as well. In fact, the change of few-layer TMDCs over time in ambient conditions can be used as a sensor mechanism. Two-dimensional electron gas (2DEG) heterostructures, typically used in metal-oxide-semiconductor field-effect transistors (MOSFETs), may also be used in the fabrication of thin-film sensor antennas, as the 3D material behaves like a 2D layer where the electrons are confined to move in only two-dimensions. One-dimensional nanowires (i.e., silver, copper, aluminum, etc.), which may be purchased commercially or synthesized experimentally, can be processed into 2D thin-films for use in sensor antenna devices. While the amounts of materials that may be used in the fabrication of a sensor antenna vary widely, they are all suitable for deposition as a 2D thin-film, and they all have unique electrical properties that can be specifically tuned for sensor applications of a given stimulus.

A sensor antenna works on the principle that the electronic properties of the material, particularly the sheet resistance ($R_s$), change as the sensor is exposed to an external stimulus. The change directly affects the impedance mismatch of the antenna to the source network and, in turn, its radiation properties. $R_s$ is a measure of the resistivity of the thin-film material as it relates to its thickness. A four-point-probe method is typically used to measure $R_s$, where two of the probes are used to force a current flow through the material being tested; the other two probes are used to measure the voltage drop. In this method, the spacing between the test probes must be larger than the thickness of the film, and the probes should be equally spaced. Thicker films have a lower sheet resistance, as the cross sectional area of the film available for carrier conduction is larger. Conversely, thinner films have a higher sheet resistance, as the cross sectional area available for carrier conduction is smaller. Additionally, a sensor antenna is fabricated from a thin-film to ensure that the stimulus interacts with the entire surface, and in the case of porous nanomaterial-based thin-films, the entire volume, of the material to produce a sensitive and accurate response in the material. Independent of the material used to construct the sensor antenna, the device must exhibit a return loss ($|S_{11}|$) at resonance within a desired range, which is achieved with the appropriate material $R_s$ and impedance matching.

In general, adjusting the thickness of the material is the easiest method for tuning the baseline electrical properties to achieve the required $R_s$. Thin-film material candidates can be engineered to meet the required $R_s$ specifications for a sensor antenna. For conventional antenna materials, such as copper or aluminum, the thin-film would need to be fabricated so that $R_s$ is between about 0.1 ohm/sq and about 1000 ohm/sq. For copper this would correspond to a thickness between about 200 nm and about 20 pm, respectively. Other nanomaterials, which do not exhibit an inherent bulk electrical conductivity as great as traditional metals (e.g., carbon nanotubes); require thicknesses on the order of approximately 1000 nm to 10 nm to achieve the required $R_s$ for a sensor antenna. To achieve improved sensitivity and quantitative sensor antenna outputs, it is beneficial to utilize films sufficiently thin to achieve approximately uniform change throughout the film volume. In some cases, the film thickness required to achieve the required $R_s$ for a sensor antenna exceeds the allowed thickness for uniform change, therefore, additional post-processing can be used to further enhance the material electrical properties and stay within the allowable thickness specifications. FIG. 1 shows the experimentally measured (squares) $S_{11}$ return loss at resonance for a variety of fabricated thin-film sensor antennas compared to theoretically modeled (solid curve) values. This data demonstrates the effect of varying $R_s$ of the sensor antenna when driven with a 50-ohm-impedance source. The resistive losses of an antenna can be analyzed in terms of the ohmic resistance and modeled as a lumped element resistance ($R_d$) for simplicity. The ohmic resistance ($R_d$) based on the antenna dimensions can be calculated according to $R_d = R_s *$ (L/W), where $R_s$ is the sheet resistance of the material, and L and W are the length and width geometrical dimension of the antenna, respectively. For a simple antenna model, in which a network analyzer input impedance is a perfect 50 ohms, the return loss $|S_{11}|$ at resonance can be calculated as $$|S_{11}| = 20 \log\left(\left|\frac{50 - (R_d + Z_{in})}{50 + (R_d + Z_{in})}\right|\right).$$

This equation implies that the ohmic losses are going to be much larger than the dielectric losses, which is a reasonable assumption as the sheet resistance of the thin-films explored in this work are much larger than that of the commonly used conductors for antennas. The sheet resistance of a thin-film takes into account the material resistivity as well as its thickness. As such, it is a good indicator of the ohmic resistance of the structure, and provides insight on how thin an antenna can be made when a target resistance is required. For an unbalanced antenna, the reactance values are a significant contributor to the input impedance at low sheet resistances. At higher sheet resistances the ohmic losses will dominate antenna performance. The resulting $|S_{11}|$ value is overlapped to the experimental data in FIG. 1. Even though the equation is based on a particular antenna type (half-wave dipole), it follows the general trend of the presented data, which includes different antenna types, such as patch and monopole antennas.

A thin-film sensor antenna may be fabricated using a number of different antenna construction techniques, and will depend specifically on the thin-film material of choice. The thin-film material can be deposited onto rigid substrates (i.e., glass, quartz, silicon, etc.) or flexible substrates (i.e., plastics, fabrics, etc.) using common thin-film fabrication methods, including: lift-off techniques, direct write, printing, spray deposition (including ultrasonic), laser scribing, dip coating, electrophoretic deposition, physical vapor deposition, chemical vapor deposition, atomic layer deposition and other deposition techniques used in the fabrication of microelectronic devices. For certain materials, such as CNTs, graphene, nanowires, etc., the material can be dispersed in a solvent (i.e., acids, organics, aqueous surfactant, etc.) and processed into a 2D thin-film by vacuum filtration. The thin-film would then be released from the filter membrane and transferred directly to the device substrate. With this technique, and others that do not allow for exact placement of the thin-film material, the substrate may be prepared with a negative mask of the desired antenna geometry allowing for the facile removal of excess material with the removal of the mask. Alternatively, a positive mask of the desired antenna geometry may be applied to the thin-film material after deposition on the substrate, allowing excess material to be removed via etching (plasma, laser, etc.), chemical or thermal treatments, etc. Depending on the fabrication technique and thin-film material used, post-processing purification (i.e., thermal oxidation, annealing, etc.) or conditioning (i.e., doping, functionalization, etc.) may be required. At the completion of the thin-film deposition, electrical contact to the thin-film sensor antenna is required. This can be done via soldering, ultrasonic welding, ultrasonic bonding, electrical conductive paste, adhesive, curing agents (including epoxy), metal matrix composites (and other additive manufacturing techniques).

As noted above, the initial material sheet resistance ($R_s$) of a thin-film antenna is important to achieving the appropriate network impedance matching and resonance for a particular sensor application. As discussed previously, the thin-film $R_s$ can be varied by changing the thickness or composition of the material. There are some cases where additional post-processing (i.e., doping, functionalization, conditioning, etc.) of the thin-film material is desired to either modify the as-deposited thin-film $R_s$, or aid in targeting a specific stimulus. Thus, the $R_s$ of an as-deposited thin-film initially may not need to fall within the specified range of values shown in FIG. 1, as the $R_s$ value can be adjusted after deposition through post-processing. FIG. 1 also shows that the power absorbed by an antenna changes dramatically based on the sheet resistance of the thin-film material, further demonstrating the utility of a device that is sensitive to any external stimulus that causes even a subtle change in $R_s$. Chemical doping involves the adsorption of a chemical species onto the thin-film causing a change in the material electrical properties by modifying the presence of carriers or their availability for conduction. Exposure to chemical dopants is done in a controlled environment, where the dopant composition, concentration, solvent delivery system, exposure time, temperature, etc. can be precisely monitored to achieve the desired material $R_s$. For example, carbon-based materials may be doped with neat liquids, such as acids (i.e., HCl, $HNO_3$, $H_2SO_4$, CSA, etc.), which protonate the thin-film material, or inorganic compounds (i.e., $N_2H_4$, $SOCl_2$, etc.), which cause an increase in electrical conductivity. Likewise, this class of materials may also be doped with ionic species, such as alkali noble metal halides (i.e., $KAuBr_4$, $KAuCl_4$, $NaAuCl_4$, etc.), gold halides (i.e., $AuCl_3$, $AuBr_4$, etc.), and halides (i.e., IBr, $Br_2$, $I_2$, etc.), where the dopant is delivered to the material in liquid form through use of a delivery solvent. Additionally, dopants such as $I_2$, can be introduced in the gaseous state allowing deeper infiltration of the dopant into the material network. In all of these cases, the amount of adsorbed dopant can be adjusted to reach the appropriate chemical concentration necessary to meet the $R_s$ requirement of the thin-film.

Electromagnetic radiation emitted by an antenna is generated when an electric or magnetic field is driven though a conductive element. Changes in the physical properties of the antenna, including $R_s$, are manifested as changes in the radiation properties of the antenna, which may be monitored at a distance. The antenna response can be measured as the attenuation, phase shift, frequency shift, impedance, or the like. Specific modalities of sensor these changes include measuring the return loss at a specific frequency or range of frequencies, measuring the radiated reflected power at a specific frequency, measuring the relative change in emitted power of a driven antenna over time and with respect to a control/reference antenna, and measuring the power received by a sensor antenna at a specific frequency or range of frequencies. The first two modalities rely on the absorption of energy by the sensor antenna, wherein an external radio frequency (RF) signal is directed towards the sensor antenna and depending on the state of the sensor antenna, it will absorb a differing amount of RF energy or absorb the energy at a different frequency. Similar to this first mode, a second mode utilizes one antenna tuned to the external antenna frequency to absorb the incident RF energy. This energy is then coupled to the sensor antenna, which emits at the same or slightly different frequency with an intensity or frequency that depends on the state of the material within the sensor antenna (i.e., the value of the $R_s$). The other modes of operation directly drive the sensor antenna at its resonant frequency and rely on an external antenna to receive the emitted power. As a result, the absolute intensity of the signal emitted by the sensor antenna and the frequency(s) of the sensor antenna can be monitored to determine the change in the material caused by the stimulus. Similarly, these signals can be monitored with respect to a reference antenna (non-sensor) to improve the signal to noise and resolution of the sensing operation. Another modality of sensing employs a sensor antenna as the receiver and measures the intensity of signal received to determine the change induced by a stimulus. This change can also be referenced to a non-sensor antenna signal to improve sensitivity.

The sensor is defined in the shape of a planar antenna. This shape may contain one or more radiating arms, radiating patches, and/or radiating slot. The radiating elements can also be composed of two arms for a dipole configuration. The radiation can be as an electric field or as a magnetic field. The ground element can be a planar conductive film of the same or different material, and/or an external ground plane of another conductive material in close proximity to the radiating arm. In the case of a dipole configuration, a ground element is not needed. Different types of planar antennas can be fabricated as a thin-film such as monopole, dipole, planar inverted F (PIFA), inverted F (IFA), patch, or the like.

The device, in accordance with the present invention, has sufficient conductivity to radiate an electromagnetic signal (i.e., the definition of an antenna) and also respond in a deterministic way to an external perturbation (i.e., the definition of a sensor). As shown in FIG. 1, a material with a sheet resistance of approximately 10 ohm/sq is needed for an unbalanced antenna with an acceptable return loss, taking $|S_{11}|$=10 dB as a benchmark, independent of the material used. However, depending on the thin-film material used to construct the sensor antenna, and the effect of the stimulus on the material's sheet resistance (i.e., whether the stimulus increases or decreases $R_s$), the exact initial sheet resistance and return loss properties may be varied over an appropriate, desired range (e.g., $R_s$ between 0.1 to 1000 ohms/sq when driven with a 50 ohm load). The data markers in FIG. 1 represent thin-film antennas that were fabricated with different materials, including MWCNTs, SWCNTs, and CNT composites. Antennas fabricated with an initially low sheet resistance may radiate better, but may not be sensitive enough to result in a measurable change in return loss upon exposure to an external stimulus. In contrast, antennas fabricated with a high sheet resistance may not initially radiate any electromagnetic signal, however, if the desired stimulus causes a decrease in $R_s$ (e.g., acts as a material dopant), exposure to the stimulus will result in an increased return loss, and the positive change in radiative properties can be sensed. The sheet resistance of an antenna fabricated with a material with a sheet resistance between the specified values, as shown in FIG. 1, or with a sheet resistance that can be modified by the stimuli to move into the specified range, will change according to the stimuli present. The change in sheet resistance will affect the ability of the antenna to radiate the applied electromagnetic signal, which can be sensed.

Different external stimuli can be detected with the sensor antenna of the present invention, which includes, but is not limited to, corrosion; molecular based doping via an analyte in vapor or liquid form; functionalization of the materials via reactive chemical species; ionizing radiation exposure induced defects; strain/stress; pressure; temperature; light; flow sensing; physical vapor deposition; or any other stimulus that modifies the sheet resistance of the thin-film material.

In an embodiment, the invention includes a system utilizing at least one sensor antenna. The sensor system is composed of a thin-film, which acts both as the sensor and the antenna simultaneously. A sensor antenna is designed to resonate at a particular frequency. When exposed to a stimulus that modifies the sheet resistance of the thin-film material, the transmitted RF signal strength is modulated (increases or decreases depending on the stimulus) at a known rate for the given stimulus. To improve accuracy, included in the system is an optional reference sensor antenna, which is shielded and protected from the stimulus of interest, and therefore, does not experience a change in its radiative properties due to the stimulus. However, changes in sensor antenna properties related to ancillary environmental factors are sensed by both sensor antennas. By comparing the signal strength of the exposed sensor antenna to the reference, changes caused by the stimulus to either degrade or enhance the wireless signal based upon the nature of the stimulation can be quantified free from ancillary environmental factors. The antenna response can change based upon the stimulation to either degrade the wireless signal or enhance it based upon the nature of the stimulation. A battery, which could be connected to a source of renewable energy, is used to power the RF transmitters.

Figure 2:
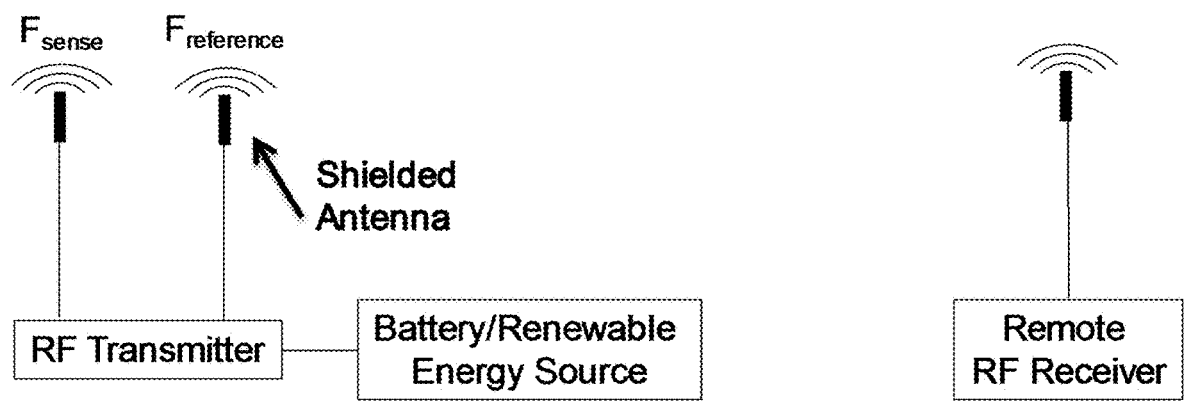
FIG. 2 is a schematic of an antenna sensor based remote system in accordance with an embodiment of the present invention.
Figure 3:
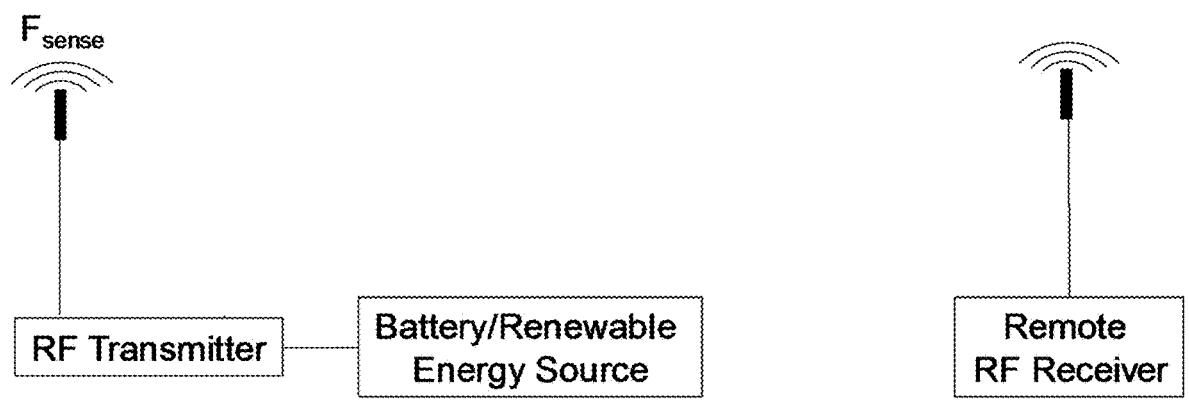
FIG. 3 is a schematic of an antenna sensor based remote system in accordance with an embodiment of the present invention.
Figure 4:
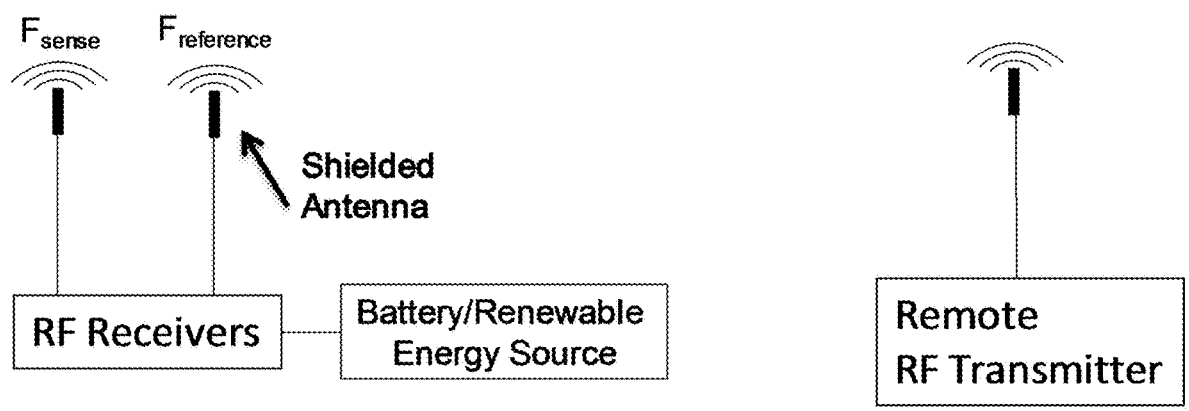
FIG. 4 is a schematic of an antenna sensor based remote system in accordance with an embodiment of the present invention.
Figure 5:
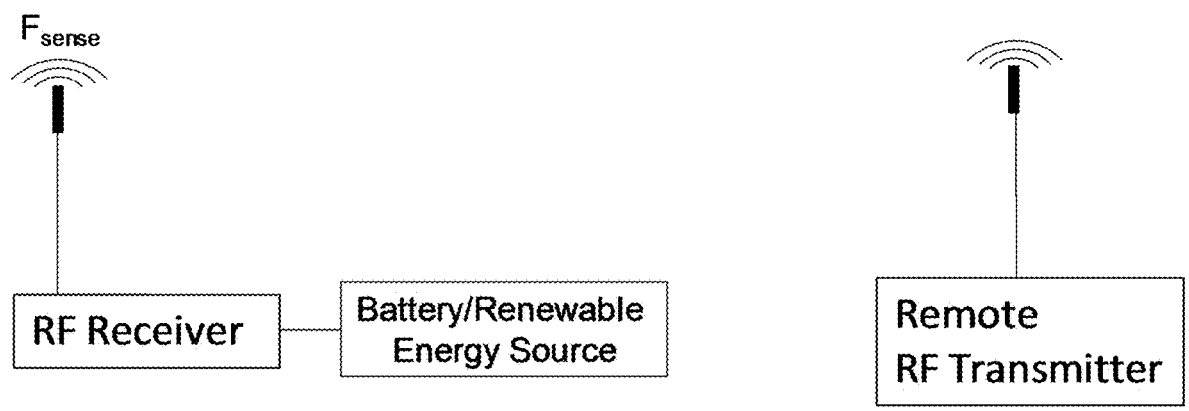
FIG. 5 is a schematic of an antenna sensor based remote system in accordance with an embodiment of the present invention.

Interrogation of the RF signal strength of a sensor antenna can take different forms. For example, FIG. 2 illustrates the sensor antenna sensing modality where the sensor antenna acts as an RF Transmitter, driven by an oscillator circuit, and powered by a battery/renewable power supply. In this modality, the sensor antenna signal intensity is received by a remote RF receiver module and it is compared to the intensity of the signal transmitted by a shielded reference sensor antenna to quantify the effects of the stimulus. The signals of the two sensor antennas may be at different frequencies and measured simultaneously, or they may be alternatively driven at the same frequency. FIG. 3 illustrates a similar modality as that of FIG. 2, but instead of using the transmitted power in reference to a shielded sensor antenna, the absolute intensity of the transmitted power determines the sensor antenna response. This configuration simplifies the signal processing and data analysis, but may reduce the sensitivity of the response. FIG. 4 shows the sensor antenna and a shielded reference antenna operating as receivers. They receive a signal from a remote RF transmitter and the intensity of the received power by the sensor antenna is compared to the shielded reference antenna to quantify the effect of the stimulus. The two sensor antennas may be tuned to the same frequency and measured simultaneously, using waving mixing circuitry, measured at alternating times, or tuned to different frequencies. FIG. 5 illustrates a similar modality as that of FIG. 4, but instead of using the transmitted power in reference to a shielded sensor antenna, the absolute intensity of the transmitted power determines the sensor antenna response. This configuration simplifies the signal processing and data analysis, but may reduce the sensitivity of the response.

Figure 6:
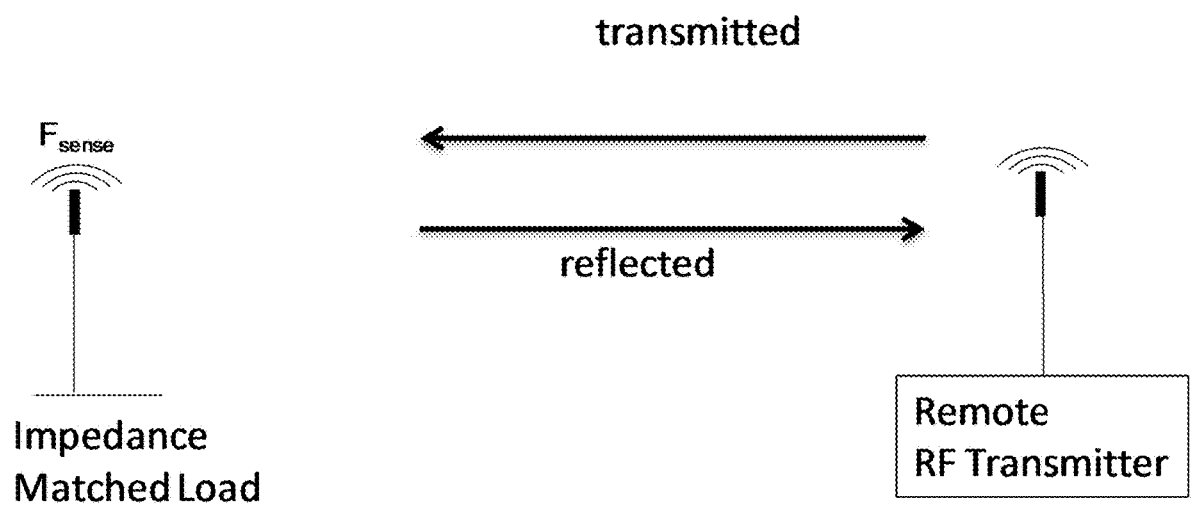
FIG. 6 is a schematic of an antenna sensor based remote system in accordance with an embodiment of the present invention.
Figure 7:
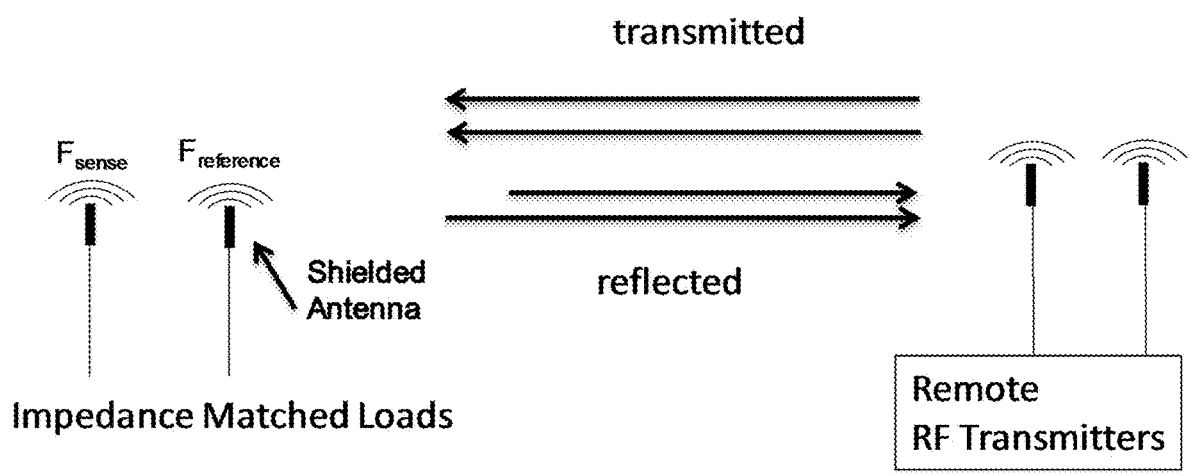
FIG. 7 is a schematic of an antenna sensor based remote system in accordance with an embodiment of the present invention.
Figure 8:
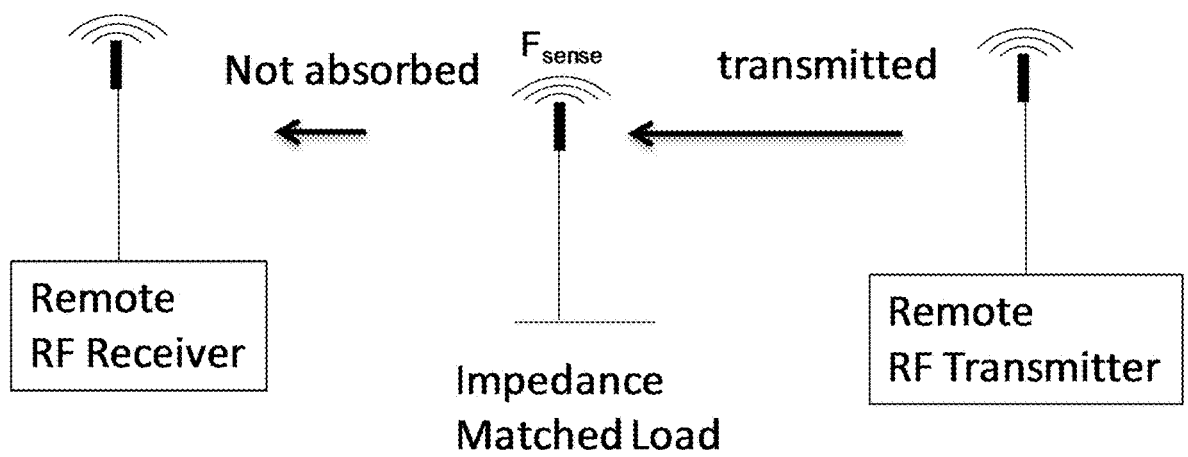
FIG. 8 is a schematic of an antenna sensor based remote system in accordance with an embodiment of the present invention.
Figure 9:
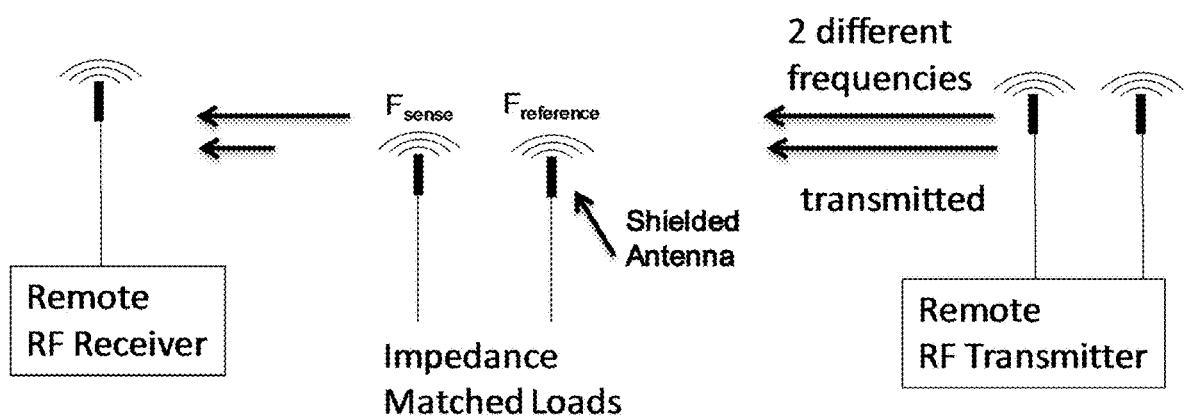
FIG. 9 is a schematic of an antenna sensor based remote system in accordance with an embodiment of the present invention.

FIG. 6 illustrates a sensor antenna sensing modality in which the sensor antenna acts as a passive receiver having impedance tuned to maximize the reflected power received from the remote transmitter. As the sensor antenna changes in response to the stimulus, the intensity of the reflected power will diminish due to a change in resonance frequency or reduction in the strength of the resonance. FIG. 7 is a refinement of FIG. 6 in which a shielded reference antenna is used alongside the sensor antenna and the intensities of the reflected powers are compared. The frequencies are illustrated by arrows and the intensities are depicted by their relative lengths. FIG. 8 illustrates a sensor antenna sensing modality in which changes in the absorbed power of the sensor antenna is used to measure its sensing response. In this case, a sensor antenna is placed between a remote transmitting antenna and a remote receiving antenna. The sensor antenna is connected to a load that is initially impedance matched, and therefore a significant fraction of the received power by the sensor antenna is dissipated as heat across the load, never making it to the receiver nor reflected back to the transmitter. Consequently, changes in the power received by the remote receive define are used to quantify the sensor antenna response. FIG. 9 shows a refinement to the FIG. 8 wherein a shielded reference antenna, with a slightly different resonance frequency, is compared to the sensor antenna.

The present invention provides the following applications, features, and advantages, including a simple remote sensing scheme, which reduces system complexity and saves operating power and resources. Sensor and signal transmission are in fact the same structure: a thin-film sensor antenna. The simple remote-sensing capabilities improve the current products by using much less energy to operate, and remove the need for control electronics that translate the sensed signal to a wireless signal. The current technology also provides an advantage over other solutions by making the entirety of the sensor the transmitting antenna, providing improved performance and sensitivity. This solves the problem of integrating the sensing element with a signal transmission element, which leads to added system complexity and cost. It is also unusual for a nanomaterial device to allow for direct sensing through changes in the intrinsic physical properties (electrical, mechanical, thermal, etc.), which modify wireless response, or through indirect sensing where the nanomaterial structure supports a sensitizing material that alters the interaction with the intrinsic physical properties of the nanomaterial. For example, a nanomaterial hybrid, which utilizes the photoconductivity effect, could wirelessly communicate under incident light stimulus and not in the dark (i.e., anti-tampering applications). Other examples would include stimuli modifying charge transfer between the supported nanostructure and the antenna material.

Such a wireless sensor can be fabricated using additive manufacturing methods, which expands the possible substrates that could be utilized as well as traditional layer deposition that may lower cost. For example, deposition onto polymers at lower temperature could be accomplished by printing, spray deposition, or other standard coating technologies. The use of nanomaterials can lead to transparent wireless sensors. Examples include dye-sensitized structures that absorb UV and change wireless response, multi-color structures (dependent on nanomaterial composition and size) that adapt to windows, or other architectures. The nanomaterial thin-films have the potential to be utilized on flexible or rigid substrates. Remote sensing and detection is an important use of the invention. Gas sensing and sensors that detect stress/strain changes can lead to applications in the biomedical, automotive, food, agriculture, manufacturing, and security industries, as well as environmental monitoring. Radiation sensing has applications in the aerospace industry, in nuclear plants, WMD detection, nuclear munition storage, and others. High radiation environments include, but are not limited to, space and nuclear production and storage facilities. Radiation exposure is harmful to humans as well as to electronic components. A reliable and long-lasting sensing and detection system is needed to remotely monitor radiation exposure level.

The disclosure will be further illustrated with reference to the following specific examples. It is understood that these examples are given by way of illustration and are not meant to limit the disclosure or the claims to follow.

Example 1—SWCNT Thin-Film Antenna Design for Radiation Exposure Sensing

Figure 10:
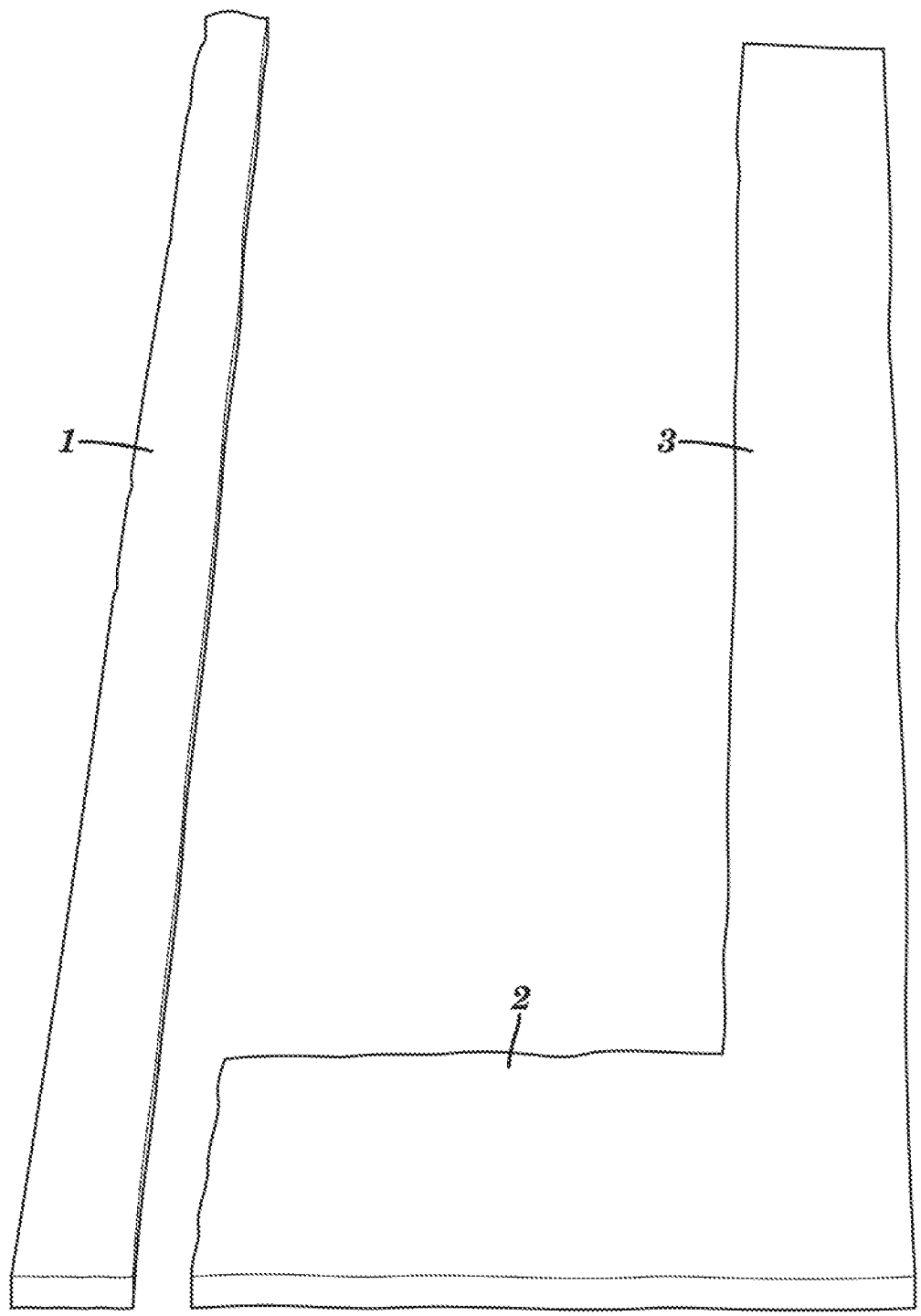
FIG. 10 is a picture of a sensor antenna having a shape fabricated in accordance with an embodiment of the present invention.
Figure 11A:
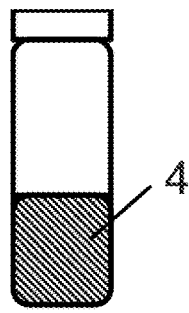
FIGS. 11A, 11B, 11C, 11D, and 11E represent a schematic of a method for fabrication of a sensor antenna in accordance with an embodiment of the present invention.
Figure 11B:
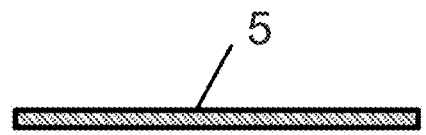
Figure 11C:
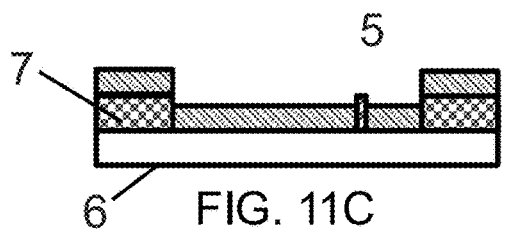
Figure 11D:
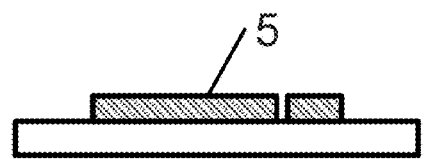
Figure 11E:
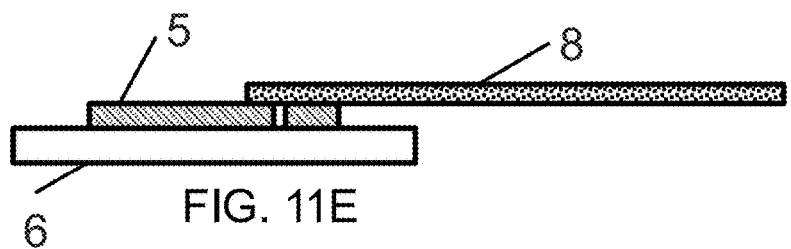

A printed microstrip antenna was chosen as a representative design compatible with SWCNT thin-film fabrication and industry test methods. The chosen fabricated design is presented in FIG. 10 and is composed of a radiating arm 1 ($L_{rad}$) adjacent to a larger ground arm composed of a fixed section 2 ($L_{g1}$), and an adjustable section 3 ($L_{g0}$). This configuration results in good impedance matching and resonance, and permits testing with both subminiature version A (SMA) coaxial RF connectors and an Anritsu 3680 coplanar waveguide universal test fixture. The length of the antenna (L) was initially calculated for a frequency (f) of ~1.5 GHz on a 1.5 mm thick soda-lime glass substrate ($\varepsilon_{eff}$=7.3), and c=3.0×10$^8$ m/s, based on $$f = \frac{0.55 \cdot c}{L\sqrt{\varepsilon_{eff}}}$$

and L=$L_{rad}$+$L_{g1}$+$L_{g0}$, while keeping $L_{rad}$=$L_{g0}$. The effective length of 2 ($L_{g1}$) is fixed at 13 mm as it has been shown for this type of antenna that the current lines at resonance will be concentrated in the inner edge of the arm.

Antennas were initially fabricated with commercially available MWCNT sheets from Nanocomp Technologies, Inc. (NCTI), as this is an affordable nanomaterial that can serve as a representative platform to develop the thin-film fabrication methods, and in order to confirm the resonance behavior of the chosen coplanar dipole antenna design and the predicted behavior. This MWCNT material has a measured thickness and conductivity of 25 µm and $5 \times 10^4$ S/m, respectively. To create the desired structures, samples can be cut with a razor blade, a laser cutter, or other methods commonly used to cut thin sheets of materials. Three antennas, with arm lengths of $L_{rad}=L_{g0}=15$, 20 and 25 mm, were fabricated using a razor blade and applied to 1.5 mm thick soda-lime glass substrates ($\varepsilon_{eff}=7.3$, loss tangent=0.01-0.05) with 25 µm of Kapton tape ($\varepsilon_{eff}=3.4$, loss tangent=0.002-0.008) used to keep the MWCNT material flat against the glass substrate. An Agilent Technologies E5061B Network Analyzer (5 Hz-30 GHz) with 50-ohm output impedance, calibrated at either the SMA or Anritsu connector, was used to analyze the performance of the antennas in air at room temperature. An effective permittivity of $\varepsilon_{eff}=2.8\varepsilon_o$, where $\varepsilon_o=8.854\times10^{-12}$ $C^2$ $N^{-1}$ $m^{-2}$, was calculated based on these results, which is a reasonable number for this type of planar antenna ($\varepsilon_{eff}=((7.3+1+1)/3)$), where the permittivity of the substrate and free space both influence the resonating behavior of the antenna. In the range of lengths studied, typical input impedances at resonance were measured with a resistance between 40 and 60 ohm and a reactance between +10 to −10 ohm.

Having confirmed the MWCNT thin-film antenna resonance response as a function of arm length, SWCNT thin-film sensor antennas were fabricated to monitor the effect of an ion irradiation stimulus. FIG. 11 illustrates an embodiment of a method for fabricating a CNT thin-film sensor antenna, which includes nanomaterial dispersion (FIG. 11A); thin-film formation and deposition (FIG. 11B); transfer to carrier or support substrate (FIG. 11C); patterning of antenna shape (FIG. 11D); and electrical contacts (FIG. 11E) for sensor antennas that directly couple to electrical circuits. In this example, the thin-film is composed of single-wall carbon nanotubes (SWCNTs). SWCNTs vary in physical and electrical properties depending on chirality, however, in this example SWCNTs produced via laser vaporization and purified through acid reflux and thermal oxidation were used, which have a diameter distribution of from 0.9 to 1.1 nm and contain a mixture of both metallic and semiconducting electronic-types. The SWCNTs were dispersed in 15 mL of chlorosulfonic acid (CSA) by acoustic mixing (Resodyn Lab) for 60 minutes at an acceleration of 10.7 m/s² to result in a dispersion 4. The final film thickness is dependent on the mass of SWCNTs added to the dispersion, which can be varied to meet a particular $R_s$ requirement. In this example, a SWCNT concentration of 30 µg/mL was used. The SWCNT dispersion 4 was processed into a 2D thin-film using a vacuum filtration process. The SWCNTs were collected on an anodisc membrane with a pore size of 0.1 µm. The particular membrane composition and pore size was selected appropriately for the nanomaterial being employed. As the bulk CSA solvent is removed, the SWCNTs bundle and stick together through van der Waals interactions, resulting in a continuous thin-film that is approximately 350 nm thick (based on optical profilometry measurements). The thin-film is then rinsed with acetone to remove residual CSA and is allowed to dry on the membrane with air pulling through the thin-film. The resultant thin-film can be released from the membrane by immersion in a deionized (DI) water bath, where the hydrophobic properties of the nanomaterial result in a self-standing film 5 that floats on the surface of the DI water bath. The self-standing film 5 can be transferred to a substrate 6, which contains masking material 7 in the pre-defined shape of the antenna with the desired geometry. The pre-defined shape of the antenna can be defined with either a photoresist like material, masking tape, or any other techniques that results in an accurate representation of the desired antenna geometry. The final shape of the antenna is accomplished by lifting off the masking material 7 to obtain the final antenna structure. After removing the masking material 7 from the surface, conditioning of the material, if needed, can be performed so that the targeted sheet resistance is met for the particular sensing application. In the current example, the CSA acts not only as a solvent, but also a chemical dopant. As such, the material exhibits an electrical conductivity greater than the intrinsic SWCNTs. Depending on the particular sensing application, the CSA may be removed by thermal oxidation (400° C. in air for 1 hour) and replaced with alternate chemical dopants, such as $KAuBr_4$, $I_2$, IBr, and the like. Electrical contacts to the radiating and/or ground elements of the final test structure are required to probe the sensor antenna when monitoring for an external stimulus. In the example of the SWCNT sensor antenna, the SWCNTs were contacted by either affixing with silver paste a subminiature version A (SMA) coaxial RF connector 8 to the radiating and ground arms for characterization with a vector network analyzer, or contacting an Anritsu coplanar waveguide universal test fixture directly with the SWCNTs.

In this particular example, the SWCNT antenna is also simultaneously used as a radiation sensor. The thickness of the SWCNT thin-film antenna must be less than 500 nm so that the radiation-induced damage inflicted by the chosen radiation source (150 keV $^{11}B^+$) is uniform throughout the volume of the sample and can affect the resonance properties of the antenna. The electrical conductivity of as-produced SWCNTs was not high enough to yield resonating antennas at that required thickness. Therefore, post-processing was required through the use of chemical doping to enhance the electrical conductivity of the as-produced SWCNT thin-films. Based on the conductivity and thickness requirements, two antennas were fabricated, Sample 1 and Sample 2, with thicknesses of 360 nm and 270 nm and sheet resistances of 6.2Ω/□ and 15.0Ω/□, respectively. The measured sheet resistance was achieved using $KAuBr_4$ as the chemical dopant. The thin-films were less than 500 nm in thickness, which ensures that the ions will penetrate through the entire volume of the SWCNT thin-film and result in uniform damage.

Figure 12:
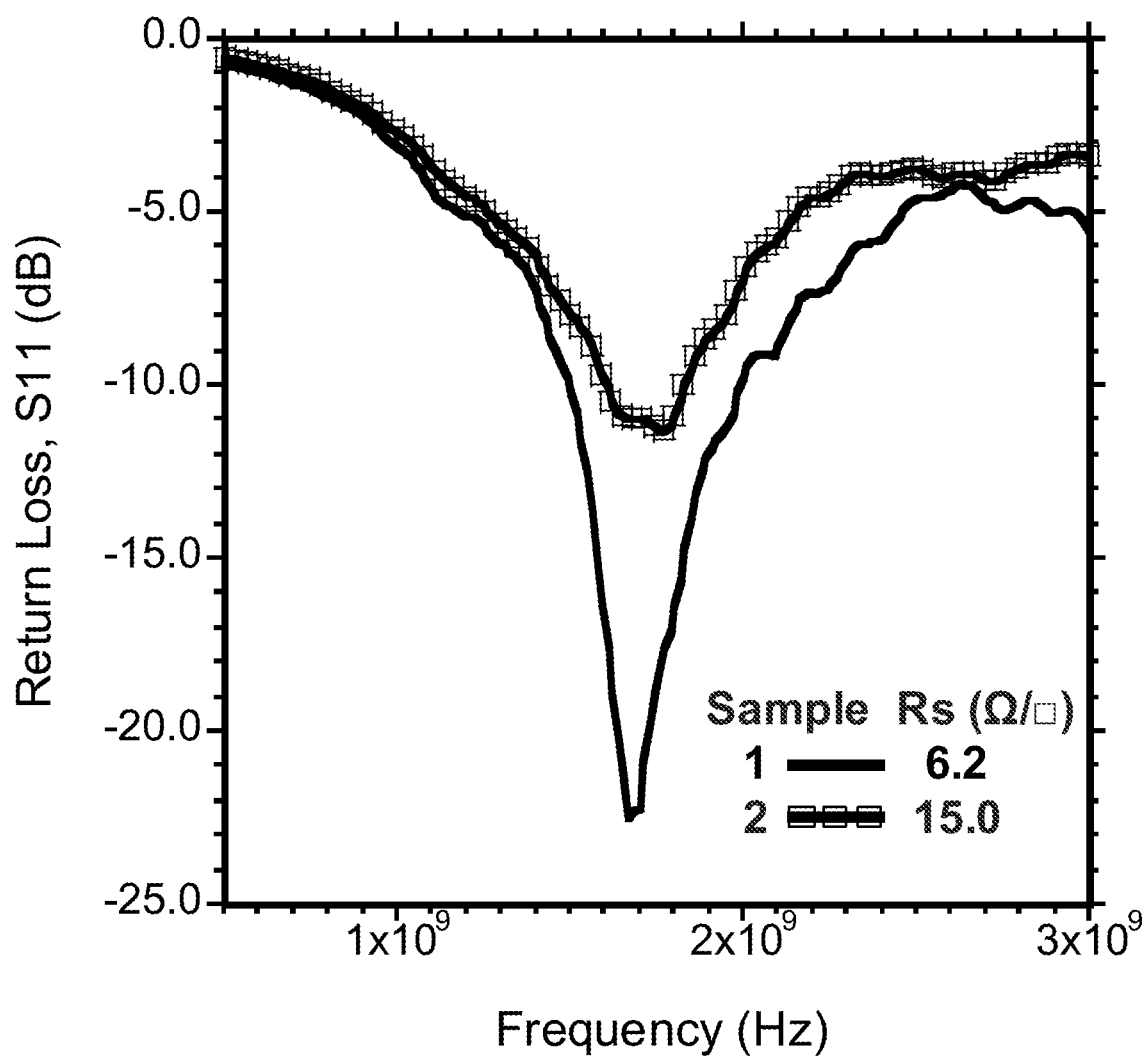
FIG. 12 is a graph showing the return loss of the fabricated dipole $KAuBr_4$-doped SWCNT thin-film antennas.
Figure 13:
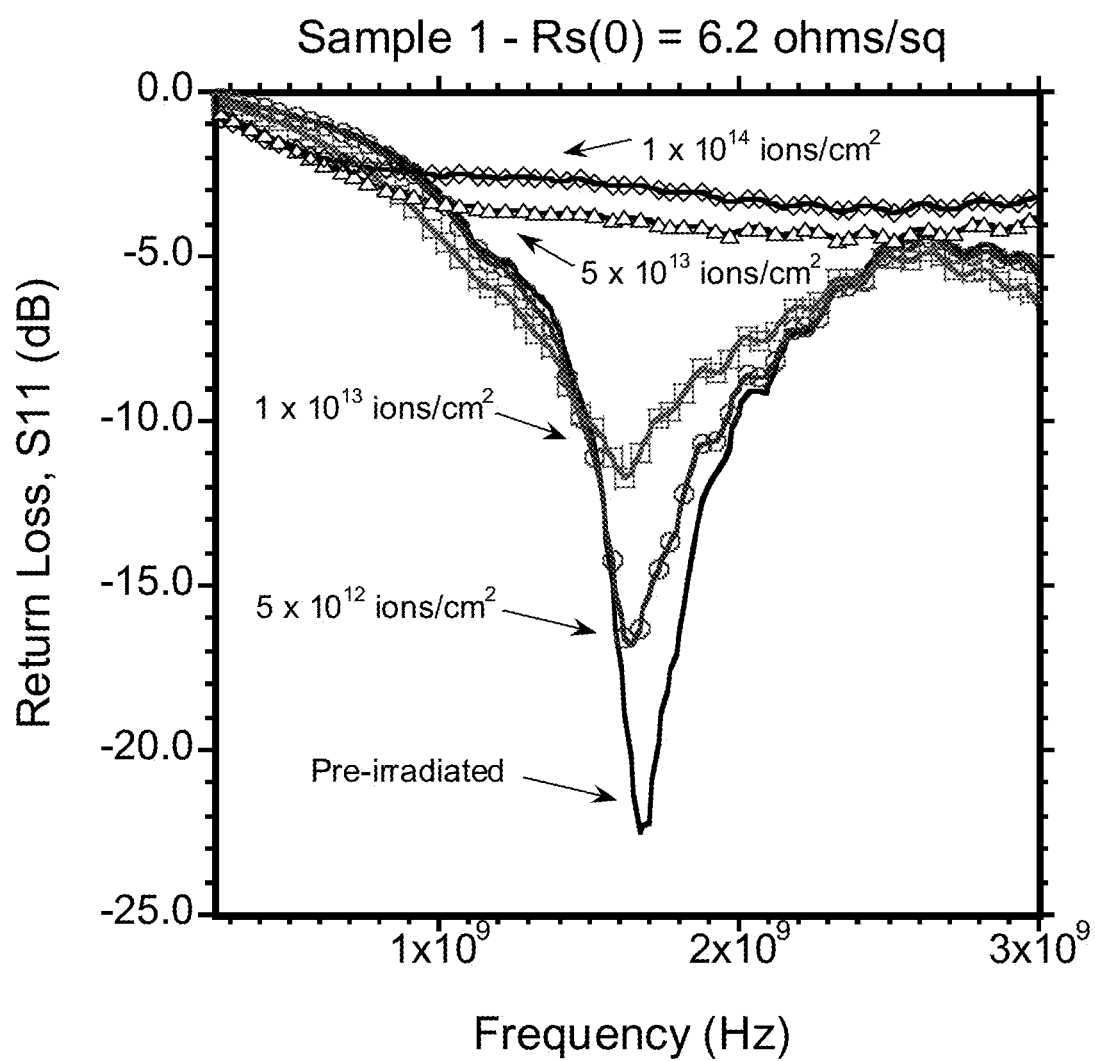
FIG. 13 is a graph showing the return-loss of Sample 1.
Figure 14:
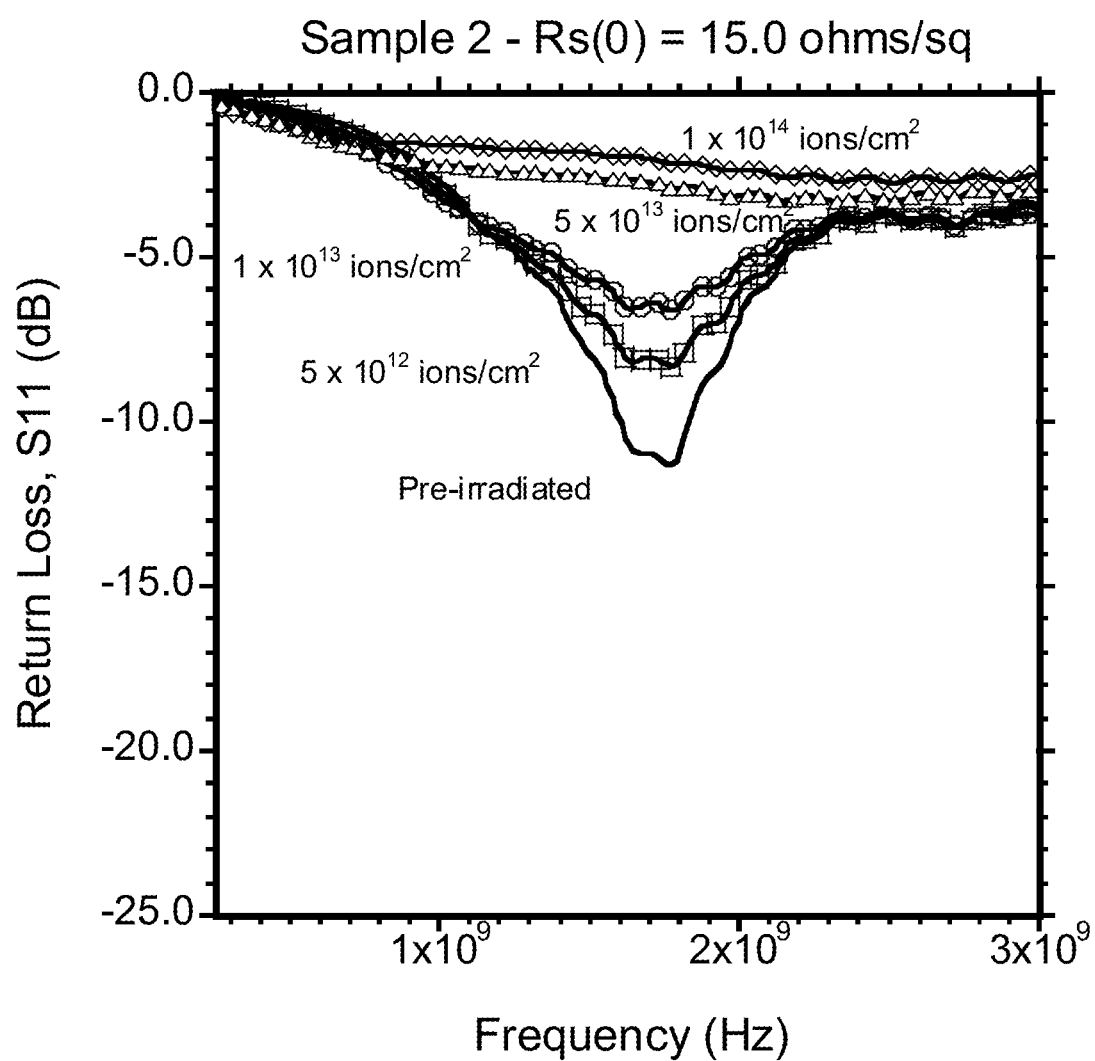
FIG. 14 is a graph showing the return-loss of Sample 2.

The return loss of the fabricated antennas was characterized as an indication of the resonant and RF signal strength of the antennas. FIG. 12 shows the return loss of the fabricated dipole $KAuBr_4$-doped SWCNT thin-film antennas. Both antennas present a resonance frequency of ~1.7 GHz. The maximum magnitude of the return loss ($S_{11}$) corresponds to the antenna with the lowest sheet resistance. Sample 1, the antenna with the lower sheet resistance, has a return loss of −22 dB, while Sample 2, with the higher sheet resistance, has a return loss of −12 dB. The fabricated antennas were irradiated with a logarithmically increasing fluence of 150 keV $^{11}B^+$ ions, with a constant beam current of 10 µA. FIG. 13 and FIG. 14 show the return loss of Samples 1 and 2, respectively, as a function of frequency as they are irradiated. FIG. 13 and FIG. 14 show that the $S_{11}$ signal strength for both samples, at the frequency of resonance, decreases as the SWCNT thin-film sensor antennas are irradiated.

Figure 15:
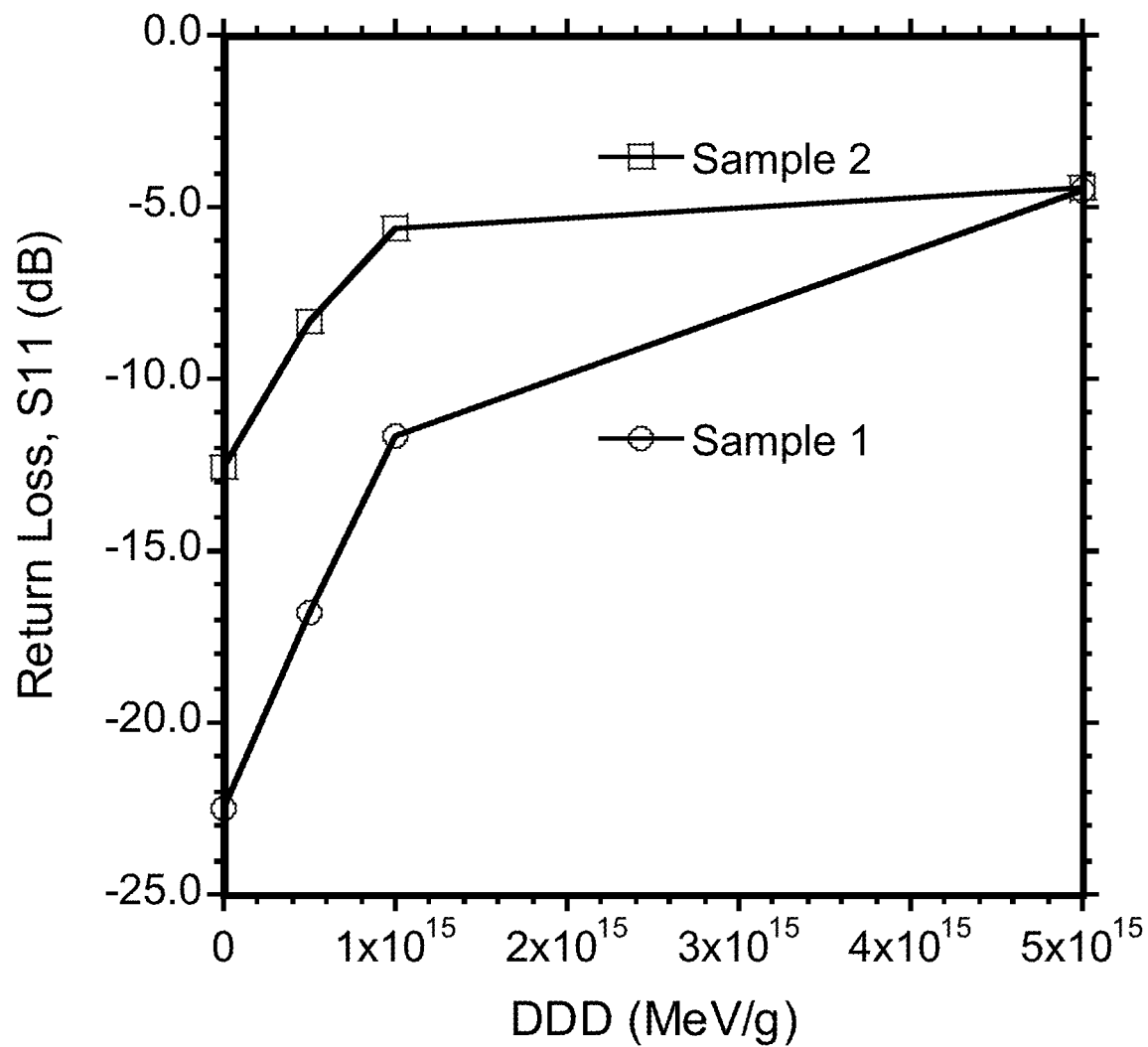
FIG. 15 is a graph showing the peak return-loss of Samples 1 and 2.

Displacement damage, as opposed to ionization damage, is expected in SWCNT thin-films exposed to the chosen $^{11}B^+$ radiation source. The displacement damage dose (DDD) can be calculated from the irradiation fluence and the non-ionizing energy loss (NIEL) of ~100 MeV·cm²/g for $^{11}B^+$ ions in a CNT film with a thickness range of 200-400 nm, assuming a CNT displacement threshold energy of 16.9 eV and density of 0.5 g/cm³. For example, exposure to 150 keV $^{11}B^+$ at a fluence of $1\times10^{12}$ ions/cm² corresponds to a DDD of $1\times10^{14}$ MeV/g. FIG. 15 summarizes the peak return-loss of the CNT antennas as a function of displacement damage dose. For Sample 1, the peak return-loss decreases at rate of $1.1\times10^{-14}$ dB/MeV/g for a DDD value less than $1\times10^{15}$ MeV/g, reaching a value of −5 dB at a DDD of ~$5\times10^{15}$ MeV/g. Sample 2 shows a signal strength decrease of $6.9\times10^{-15}$ dB/MeV/g for a DDD value less than $1\times10^{15}$ MeV/g, reaching a value of −5 dB at a DDD of $1\times10^{15}$ MeV/g. Both antennas present a similar sensitivity to DDD and the antenna with the higher sheet resistance does not absorb any of the supplied power at a lower DDD. Therefore, the signal strength of the antennas can be used as an indication of the radiation exposure and the sheet resistance of the antenna, and can be designed for a particular sensitivity as well as a maximum DDD value. Other types of interrogation can be used.

Example 2—Dipole SWCNT Thin-Film Antenna Design for Temperature Sensing

Figure 16:
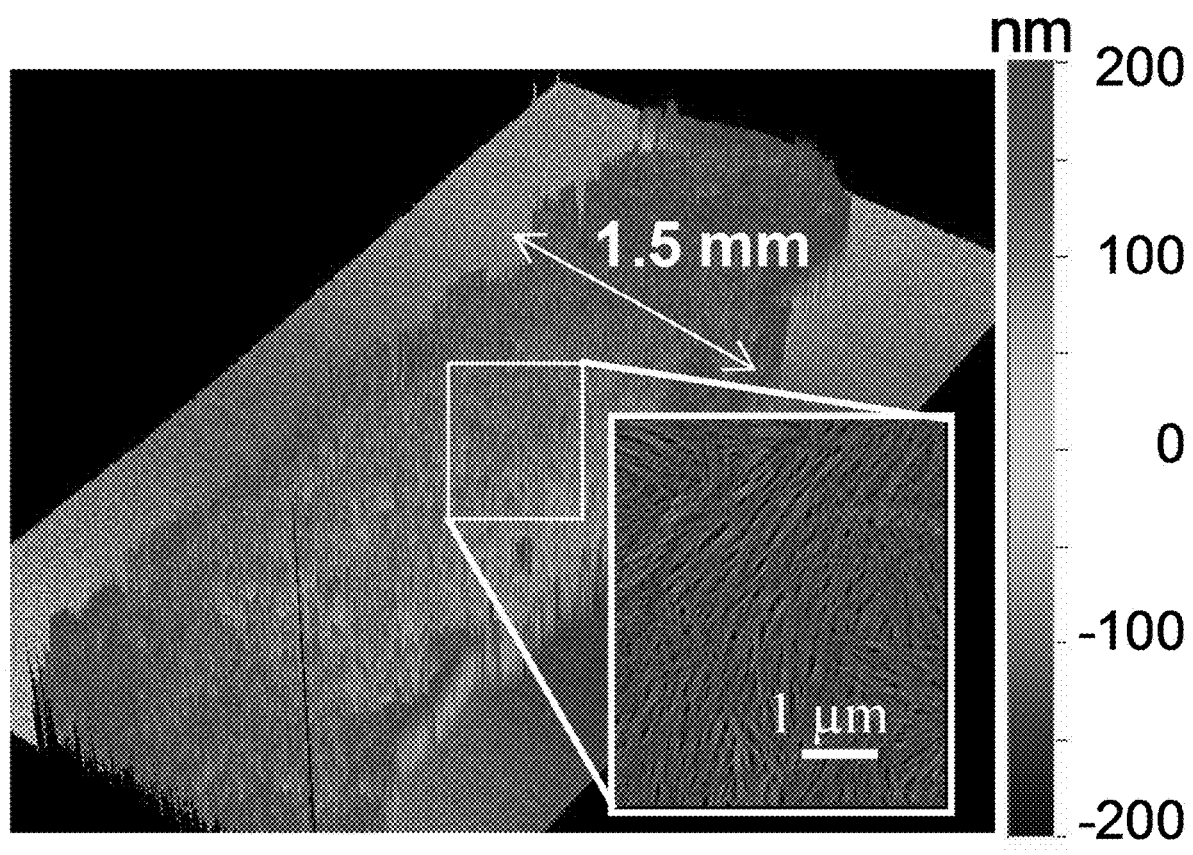
FIG. 16 is a profilometer scan and SEM of the surface of a SWCNT thin-film.

SWCNT dipole thin-film antennas were fabricated by dispersing 450 μg of purified laser-vaporized (LV) SWCNTs in 15 mL of chlorosulfonic acid (CSA). The SWCNTs were mixed in a Resodyn LabRAM mixer for 60 minutes at an acceleration of 10.7 m/s², and were subsequently collected by vacuum filtration on an Anodisc membrane (Whatman, 0.02 μm pore size, 47 mm outer diameter). The thin-film was dried with the pump on for 30 minutes before applying acetone, and subsequently dried for an additional 30 minutes. The as-produced SWCNT thin-film was released from the membrane by immersion in a deionized (DI) water bath and transferred to a glass slide, which contained the masked shape of the antenna. The SWCNT thin-film was then dried for 18 hours at 21° C. in air prior to lifting the masking material off to obtain the final antenna structure, shown in FIG. 10. The SWCNT thickness was measured as 350 nm+/−15 nm using a Veeco Wyko NT100 surface profilometer as shown in FIG. 16, where the surface morphology of the SWCNT thin-film can be observed. Although some local alignment of the SWCNT bundles is observed in the SEM of the inset of FIG. 16, no overall long range alignment is realized and the film can be considered as isotropic.

The highly effective nature of CSA to debundle SWCNTs aids in the fabrication of high quality, uniform SWCNT thin-films, free from surfactants or other small molecules. In addition, studies indicate that CSA acts as a p-type dopant and increases the conductivity of SWCNT material by electron withdrawal, yet it may be removed from the SWCNT network via thermal oxidation. Consequently, this provides a means to vary the electrical conductivity of a CNT network beginning with a fully CSA doped film and systematically reducing the doping by heating the film to increasing temperatures.

Figure 17:
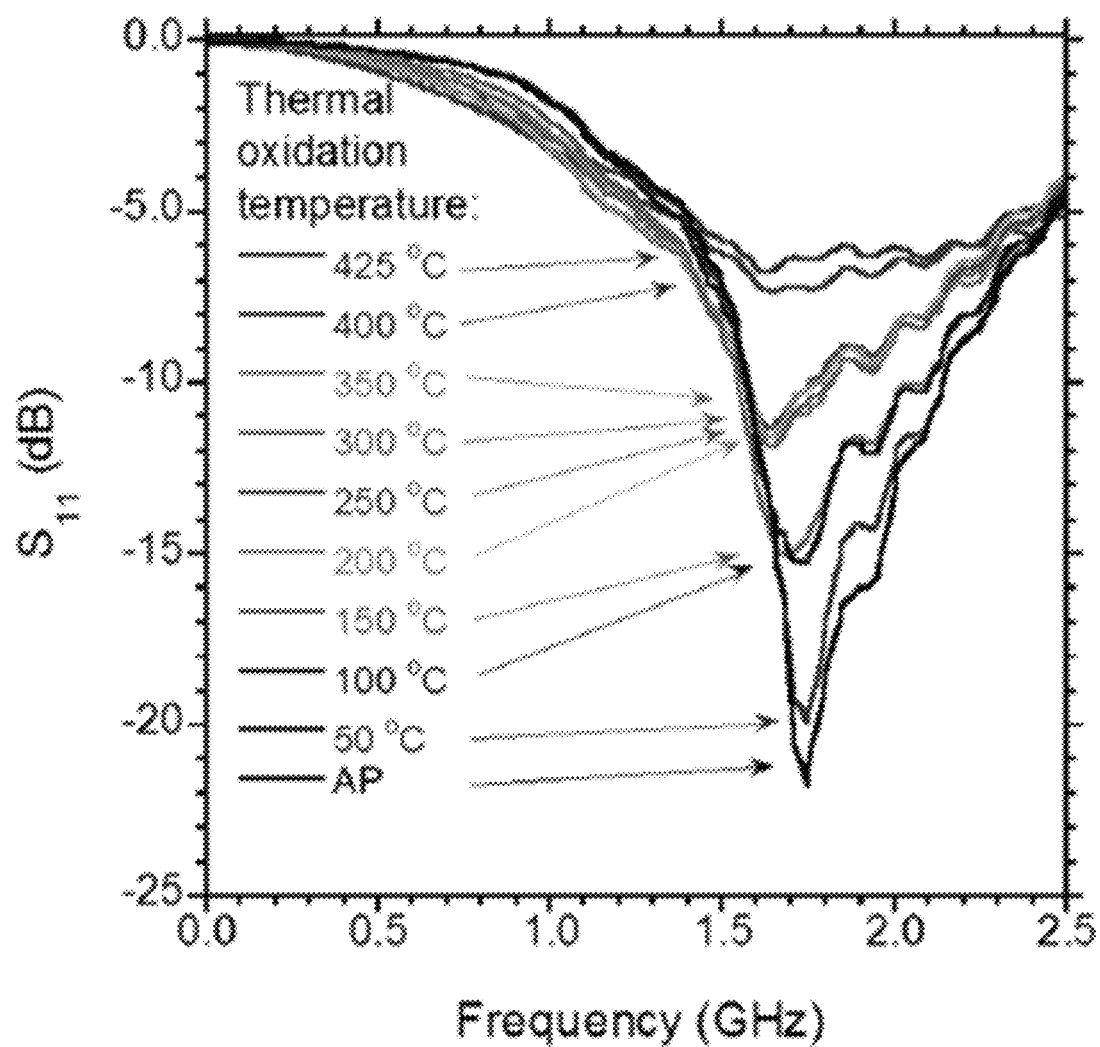
FIG. 17 is a graph of measured return-loss and thermal oxidation temperature of the SWCNT thin-film antenna as a function of frequency.
Figure 18:
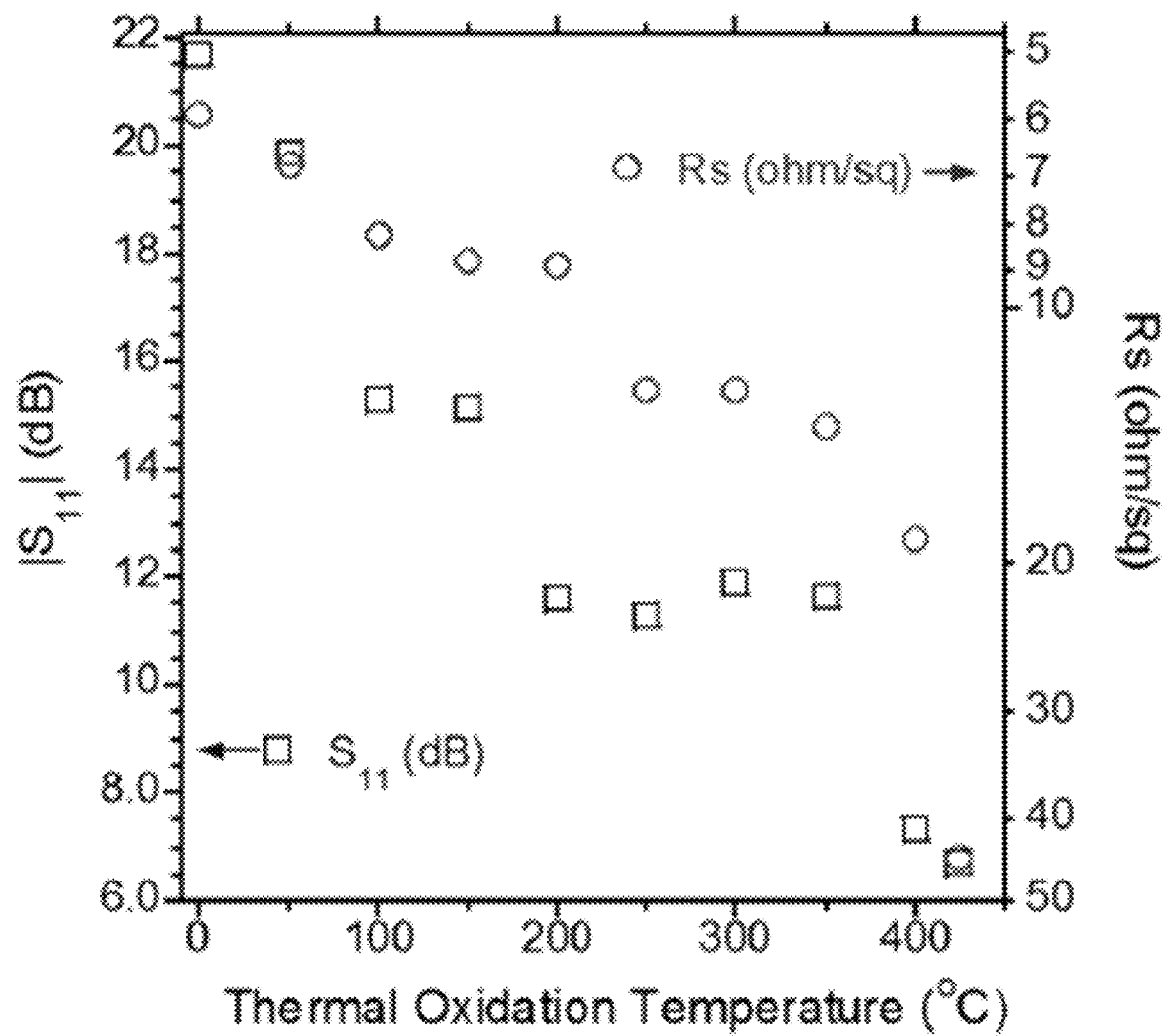
FIG. 18 is a graph of measured return-loss and sheet resistance of the SWCNT thin-film antenna as a function of thermal oxidation temperature.

The fabricated SWCNT thin-film antenna was thermally oxidized for 30 minutes at each of the temperatures shown in FIG. 17, and cooled to room temperature prior to characterization through $S_{11}$ and sheet resistance measurements. FIG. 17 shows the measured $S_{11}$ of the SWCNT thin-film antennas as a function of thermal oxidation temperature between 50° C. to 425° C. Without any further matching of the antenna, there is a progressive decrease in the magnitude of the $S_{11}$ with increasing thermal oxidation temperature as the antenna becomes mismatched to the 50-ohm source impedance. FIG. 18 summarizes the changes in $|S_{11}|$, as well as the measured sheet resistance ($R_s$), of the SWCNT thin-film antennas as the thermal oxidation temperature is increased. There is a correlation between the measured $S_{11}$ at resonance and the sheet resistance, which manifests in a decrease in $|S_{11}|$ as the material sheet resistance increases and the antenna becomes unmatched. The initial sheet resistance of the as-produced (AP, CSA doped) antenna is 5.9 ohm/sq, with a resonant frequency of ~1.7 GHz and $S_{11}$ of −21.7 dB at resonance. Following thermal oxidation at 50° C. for 30 min, an increase in sheet resistance to ~6.8 ohm/sq and a decrease in $S_{11}$ to −19.9 dB is observed (see FIG. 17), indicating a slight change in impedance matching. The minor loss of antenna performance indicates that the CSA dopant is only slightly removed from the SWCNT thin-film. Increasing the thermal oxidation temperature above the boiling point of water (>100° C.) results in an increase in sheet resistance to 8.2 ohm/sq, and $S_{11}$ is decreased to −15.2 dB, indicating further impedance mismatch. The sudden increase in sheet resistance observed after this thermal oxidation step may be explained by water evaporating from the SWCNT thin-film. As the temperature of the thermal oxidation is increased even further beyond 150° C., a second decomposition event takes place, which coincides with the boiling point of CSA (151 to 152° C.). At a thermal oxidation temperature of 250° C., the sheet resistance increases to 12.5 ohm/sq and the $S_{11}$ decreases stepwise to −11.6 dB. FIG. 17 and FIG. 18 show that a third decomposition event takes place at 400° C., where the antenna resonates with a low quality factor and increased reflected power. The sheet resistance increases to 44.6 ohm/sq after 425° C. indicating the electrical conductivity enhancement provided by the CSA dopant has been completely removed.

Figure 19:
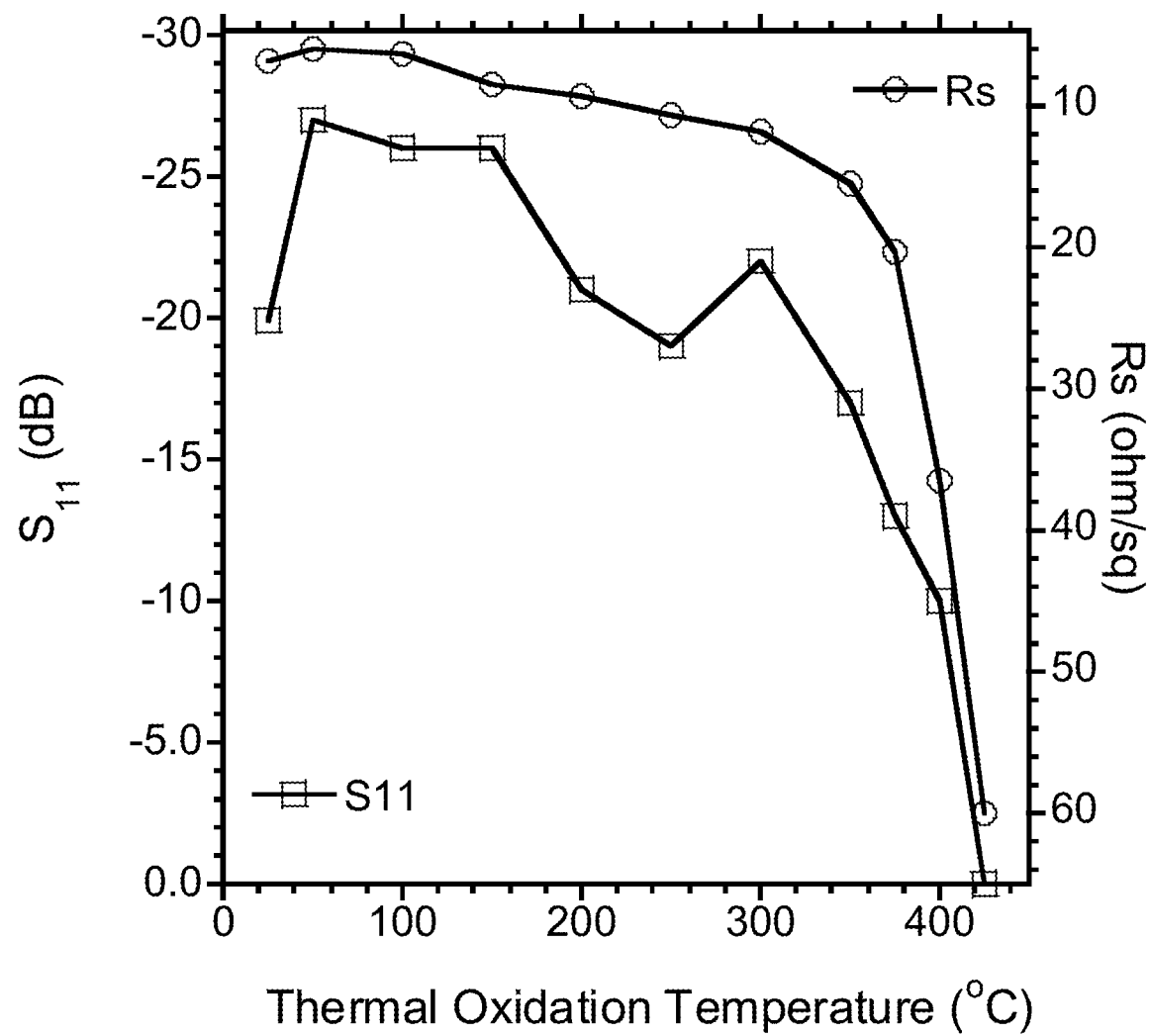
FIG. 19 is a graph of measured return-loss and sheet resistance of the SWCNT thin-film antenna as a function of thermal oxidation temperature.
Figure 20:
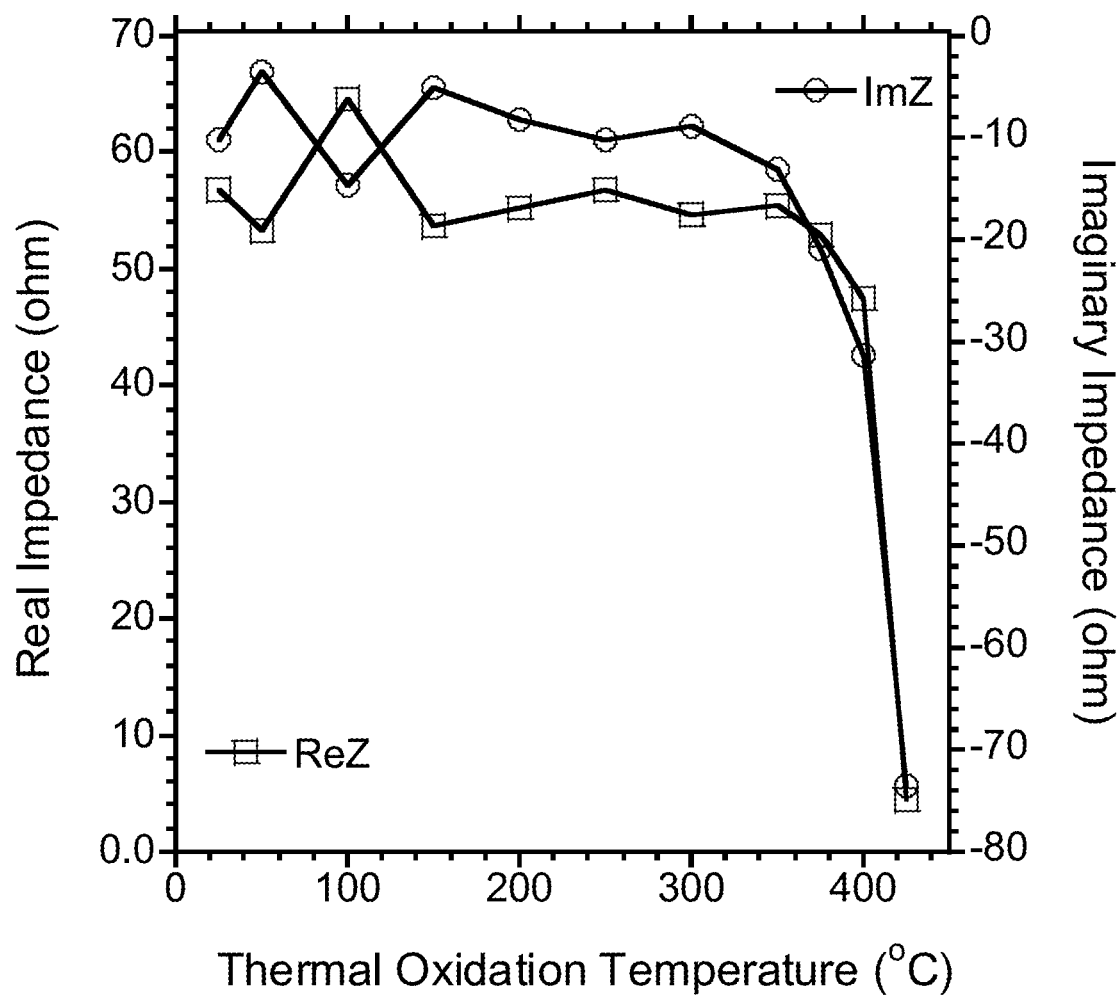
FIG. 20 is a graph of measured real and imaginary impedance at resonance of the SWCNT thin-film antenna as a function of thermal oxidation temperature.

A second SWCNT thin-film antenna was fabricated to further investigate the effect of the impedance mismatch on the performance of this type of antenna as it relates to changes in the sheet resistance. FIG. 19 shows the value of $S_{11}$ at resonance and the measured DC sheet resistance (presented in this case in a linear scale), while FIG. 20 shows the measured real and imaginary impedance at resonance of the thin-film antenna after each of the thermal oxidation step without any matching. The changes in measured input impedance follow a similar trend to that of the sheet resistance. Both the real and the imaginary components of the impedance show a slight decrease in magnitude from 56.82−j10.24 ohm at room temperature to 62.96−j20.93 ohm after the 375° C. thermal oxidation step. This correlates to a decrease of $S_{11}$ from −19.9 to −13.0 dB, and an increase of sheet resistance from 6.8 to 20.5 ohm/sq. When the thermal oxidation temperature is increased to 425° C. the antenna is essentially turned off as the $S_{11}$ approaches 0 dB and the input impedance is measured as 4.48−j73.45 ohm. This indicates that not only is the input impedance of the antenna not well matched, but that the resistance of the thin-film has also become so large that the antenna does not resonate.

Figure 21:
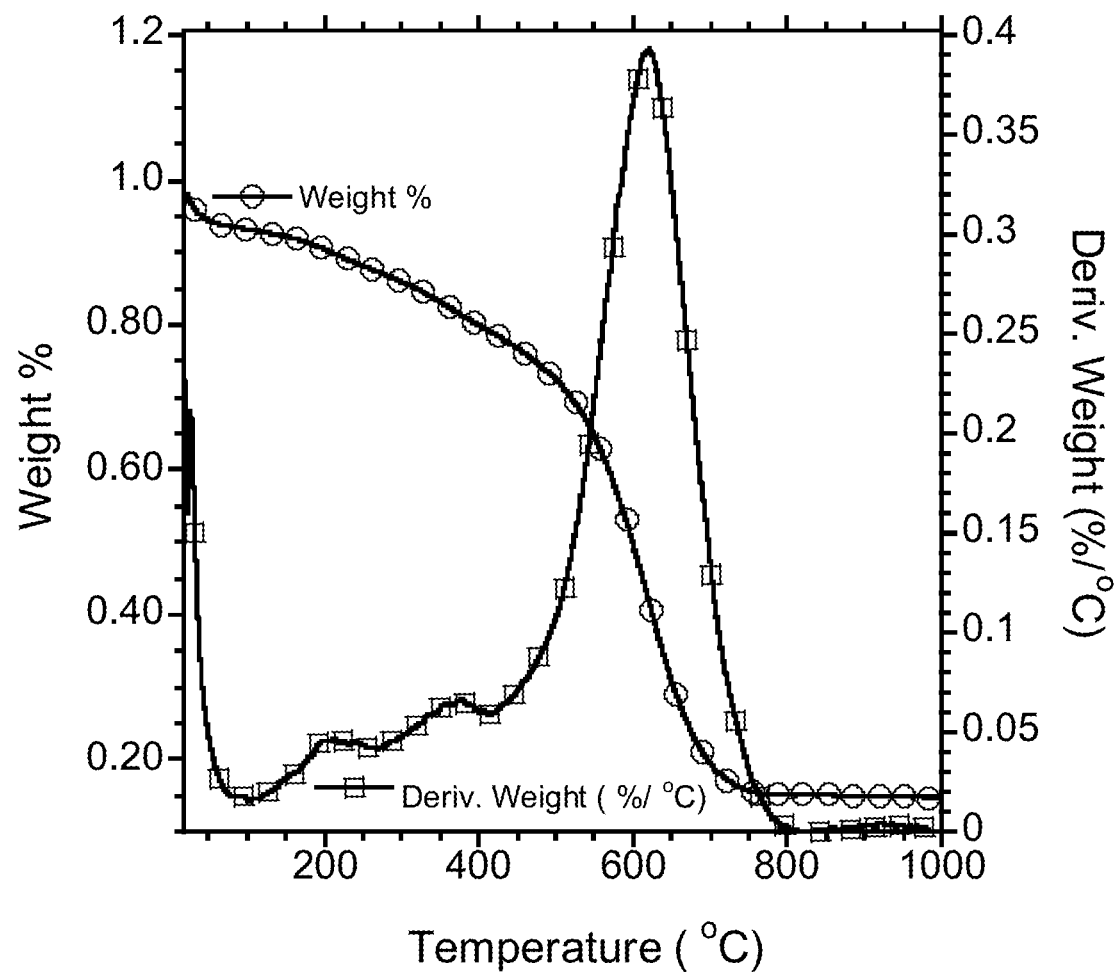
FIG. 21 is a graph of weight % and derivative of weight % of the SWCNT thin-film antenna as a function of temperature.

The sequential removal of CSA from SWCNT thin-films during thermal oxidation, leading to the complete dopant removal at 400° C., has been shown previously using spectroscopic analysis (Raman and optical absorbance spectroscopy). Thermogravimetric analysis (TGA) was performed on a representative sample to confirm the decomposition events observed in the sheet resistance and $S_{11}$ measurements. FIG. 21 shows, that after an initial weight loss at around 100° C., there are two additional decomposition events at around 200° C. and 400° C. that correspond to the stepwise degradation observed in sheet resistance, impedance mismatch, and $S_{11}$. The fact that very little power is delivered to the antenna at a sheet resistance value above ~40 ohm/sq indicates that a defined resistance value is needed to reduce the resistive losses due to the conductivity of the material.

Although various embodiments have been depicted and described in detail herein, it will be apparent to those skilled in the relevant art that various modifications, additions, substitutions, and the like can be made without departing from the spirit of the disclosure and these are therefore considered to be within the scope of the disclosure as defined in the claims which follow.

What is claimed:

1. A sensor antenna comprising:
    a thin film material constructed in the shape of an antenna having a response, the material comprising a designed sheet resistance capable of being modified by an external stimulus where the modified designed sheet resistance alters the antenna response to electromagnetic radiation.

2. The sensor antenna according to claim 1, wherein the thin film material comprises carbon nanotubes, graphene, semiconductor nanowires, nanotubes, or 2D materials.

3. The sensor antenna according to claim 1, wherein the sheet resistance target range is from about 0.1 ohms/square to about 1000 ohms/square and the given matching network is a 50 ohm network.

4. The sensor antenna according to claim 1, wherein the antenna response is measured as the attenuation, phase shift, frequency shift, or impedance.

5. The sensor antenna according to claim 1, wherein the sensor antenna is paired against a reference antenna in a manner sufficient to determine a calibration curve.

6. The sensor antenna according to claim 1, wherein the external stimulus comprises corrosion, molecular based doping via analyte in vapor or liquid form, functionalization of the materials via reactive chemical species, ionizing radiation exposure induced defects, strain/stress, pressure, temperature, light, physical vapor deposition, or flow sensing.

7. The sensor antenna according to claim 1, wherein the shape of the antenna comprises a monopole, dipole, planar inverted F, inverted F, or patch.

8. The sensor antenna according to claim 1, wherein the antenna comprises a planar configuration.

9. The sensor antenna according to claim 1, wherein the antenna is flexible.

10. A system comprising a sensor antenna according to claim 1, further comprising a reference antenna shielded from the external stimulus such that the difference in measured response between the sensor antenna and the reference antenna provides a measure of the change of the stimulus experienced by the sensor antenna.

11. A method for operating a thin film sensor antenna comprising:
    providing a thin film sensor antenna comprising a designed sheet resistance capable of being modified by an external stimulus where the modified designed sheet resistance alters the antenna response to electromagnetic radiation;
    exposing the sensor antenna to the external stimulus;
    simultaneously sensing the external stimulus while altering the sensor antenna response;
    measuring the change in the sensor antenna response; and
    correlating the measured response to a known change in the stimulus.

12. The method of claim 11, wherein the sensor antenna is a receiver.

13. The method of claim 11, wherein the sensor antenna is powered.

14. The method of claim 11, wherein the sensor antenna is a passive antenna.

15. The method of claim 11, further comprising providing a reference antenna.

16. The method of claim 11, wherein the sensor antenna is a transmitter.

17. A method of making a sensor antenna, comprising:
    providing a thin-film of a material comprising a designed sheet resistance capable of being modified by an external stimulus where the modified designed sheet resistance alters the antenna response to electromagnetic radiation;
    depositing the thin-film on a substrate;
    patterning the thin-film into the shape of an antenna having a response; and
    providing the antenna with electrical contacts sufficient to function as an antenna.

18. The sensor antenna according to claim 17, wherein the external stimulus comprises corrosion, molecular based doping via analyte in vapor or liquid form, functionalization of the materials via reactive chemical species, ionizing radiation exposure induced defects, strain/stress, pressure, temperature, light, physical vapor deposition, or flow sensing.

\* \* \* \* \*